(12) United States Patent
Swaminathan

(10) Patent No.: US 11,989,706 B2
(45) Date of Patent: May 21, 2024

(54) OPEN INFRASTRUCTURE FOR VENDING MACHINE PAYMENTS FROM MOBILE DEVICES

(71) Applicant: Kishore Swaminathan, Willowbrook, IL (US)

(72) Inventor: Kishore Swaminathan, Willowbrook, IL (US)

(*) Notice: Subject to any disclaimer, the term of this patent is extended or adjusted under 35 U.S.C. 154(b) by 98 days.

(21) Appl. No.: 17/125,621

(22) Filed: Dec. 17, 2020

(65) Prior Publication Data

US 2021/0192479 A1 Jun. 24, 2021

Related U.S. Application Data

(60) Provisional application No. 62/950,361, filed on Dec. 19, 2019.

(51) Int. Cl.
| | |
|---|---|
| G06Q 20/10 | (2012.01) |
| G06Q 20/02 | (2012.01) |
| G06Q 20/18 | (2012.01) |
| G06Q 20/20 | (2012.01) |
| G06Q 20/32 | (2012.01) |
| G06Q 20/38 | (2012.01) |
| G06Q 30/0601 | (2023.01) |
| G07F 9/00 | (2006.01) |
| H04W 12/40 | (2021.01) |
| G06K 7/14 | (2006.01) |

(52) U.S. Cl.
CPC ......... *G06Q 20/102* (2013.01); *G06Q 20/027* (2013.01); *G06Q 20/18* (2013.01); *G06Q 20/202* (2013.01); *G06Q 20/3226* (2013.01); *G06Q 20/3821* (2013.01); *G06Q 20/3825* (2013.01); *G06Q 30/0633* (2013.01); *G07F 9/001* (2020.05); *G07F 9/002* (2020.05); *H04W 12/40* (2021.01); *G06K 7/1417* (2013.01); *G06Q 20/326* (2020.05); *G06Q 20/3276* (2013.01)

(58) Field of Classification Search
CPC ......... G07F 9/002; G07F 9/001; G06Q 20/18; G06Q 20/3821; G06Q 20/3226; G06Q 20/202; G06Q 30/0633; G06Q 20/027; G06Q 20/3825; G06Q 20/3223; G06Q 20/102; G06Q 20/3276; G06Q 20/326; H04W 12/106; H04W 12/40; G06F 21/53; G06K 7/1417
USPC .............................................. 705/21
See application file for complete search history.

(56) References Cited

U.S. PATENT DOCUMENTS

| | | | |
|---|---|---|---|
| 8,856,045 B1 * | 10/2014 | Patel ................. | G06Q 20/326 705/79 |
| 9,240,007 B2 * | 1/2016 | Barragán ............ | G06Q 20/18 |

(Continued)

*Primary Examiner* — Igor N Borissov

(57) ABSTRACT

An open framework for mobile payments to vending machines (VM) comprises a namespace and a payment bus: the namespace provides unique IDs for VMs, and the payment bus enables payers to pay any VM through any payment service of their choice. Embodiments describe how this invention caters to online VMs with a wide-area data connection and offline VMs with no data connection. Described herein is a VM module that enables traditional VMs to be retrofitted. The twin goals of our invention are (a) to give customers and vending machine operators a universal payment platform and (b) to enable vending machine operators to reduce their capital and operational costs.

23 Claims, 24 Drawing Sheets

(56) References Cited

U.S. PATENT DOCUMENTS

| | | | |
|---|---|---|---|
| 2008/0077649 A1* | 3/2008 | Barker | H04L 9/40 709/202 |
| 2012/0029691 A1* | 2/2012 | Mockus | G07F 9/023 700/231 |
| 2014/0074714 A1* | 3/2014 | Melone | G06Q 20/322 235/487 |
| 2021/0134103 A1* | 5/2021 | Yamato | G07F 17/12 |

* cited by examiner

Payment Request PR

```
[ "header": {
    "type": "request",
    "request_id": 678086979,
    "payee": "KC-121",
    "payee_agent": "VMA1",
    "amount": 3.50,
    "taxes": 0.0,
    "currency": "usd",
    "timestamp": 1576411832,
    "exp": 1576412132,
    "status": "active"
},
"body": {
    "desc": {"Coke 12oz Can",
             "Lays Chip Bag"},
    "qty": {1, 1},
    "price": {2.00, 1.50}
}]
```
602

Payment Transaction Record PTR

```
[ "header": {
    "type": "transaction",
    "transaction_id": 768787980,
    "confirmation_id": "C454536788",
    "guarantor": "PA1",
    "request_id": 678086979,
    "payee": "KC-121",
    "payee_agent": "VMA1",
    "payer_agent": "PA1",
    "amount": 3.50,
    "currency": "usd",
    "timestamp": 1576411892,
},
"body": {},
"tracker": {
    "gateway": "stripe",
    "payment_source": "CC9267810",
    "payer": "angela@elfpoint.com"
}]
```
604

Agent-to-VM Record AVMR

```
["header": {
    "type": "avmr",
    "avmr_id": "VMA1-426489",
    "payee_agent": "VMA1",
    "payee": "KC-121",
    "request_id": 678086979,
    "timestamp": 1576411896,
    "action": "vend"
},
"body": {
    "commands": {"self_diagnostics"}
}]
```
606

Fig. 06

OPEN INFRASTRUCTURE FOR VENDING MACHINE PAYMENTS FROM MOBILE DEVICES

CROSS-REFERENCE TO RELATED APPLICATIONS

The present application claims the benefit of U.S. Provisional Patent Application No. 62/950,361 which is incorporated by reference herein in its entirety.

FIELD OF INVENTION

This invention is in the fields of vending machines and mobile payments. It describes systems and methods for vending machines to accept mobile payments with minimal infrastructure.

BACKGROUND

Today's electronic payments, including vending machine payments are Merchant Centric Payments (MCP), where the merchant owns and orchestrates the payment process: to pay, the payer turns over one's payment credentials—typically a credit or debit card—to the merchant or the vending machine (VM). The latter now takes over and orchestrates the payment process by contacting its preferred payment gateway, authorizing the payer's credentials, transferring funds and finally confirming the transaction. See FIG. 01 for a high-level view of the MCP paradigm.

A recognized problem of MCP is that payers have to share their payment credentials with every merchant and machine they pay to. Unattended VMs in remote locations can be tampered with and payers' credentials can be compromised. Second, the underlying IT systems that store these credentials can be broken into by cyber criminals, leading to the theft of thousands of credentials—an occurrence that's all too common. Third, for unattended VMs exposed to the elements, a full-fledged payment machinery can be expensive as it has to be rugged and tamper-proof. When the payment machinery becomes expensive, the machines themselves are prone to theft and vandalism. Fourth, failure of its payment system can be catastrophic for a VM due to lost revenue. By leveraging payer's devices for payment, VMs can mitigate this failure risk.

Today, every customer has access to a smart device with network access that is often more powerful and has a faster renewal cycle than most VMs. So, it is now possible to shift the responsibility for payments from the VMs to customers: a win-win strategy that provides convenience and security for payers and reduces cost for VM operators.

Today's Mobile Solutions

Recently, VMs are being equipped for NFC-based contactless mobile payments. Note that contactless payments are also merchant-centric: the mobile device transmits the customer's credentials to the merchant. It is the merchant, not the device, that orchestrates the payment. But many other mobile payment solutions for VMs now exist. While specifics vary, broadly, all these solutions have to address two major problems: (a) how to establish an association between a VM and a user's mobile device, and (b) how to enable payment from the customer's device.

For the first problem, most of the solutions rely on a wireless, peer-to-peer (P2P) connection between a mobile device and the VM, as for example, in U.S. Pat. No. 9,547,859 of Patel et al, U.S. Pat. No. 10,423,949 of Lyons et al and WO Pat. No. 2020/115567 of Prattipati. The problem with a wireless P2P connection is that it can be unfriendly and dangerous in places like a crowded airport or a gaming arcade with hundreds of VMs. How does a user pair with the right machine to buy a soda? What assurance does the user have that a wireless signal is to and from a specific VM? How safe is a wireless connection from viruses and other malware? Can unscrupulous hackers convert VMs into malware servers?

Customers typically identify a VM by sight and proximity. Any connection modality that does not have a clear visual cue or proximality requirement to indicate which VM a customer is connecting to is problematic. More seriously, if the modality has the ability to harm a device, that will be a big impediment to use. Wireless P2P solutions can work for VMs under laboratory conditions but cannot scale in the cacophony of hundreds of wireless signals in the real world. Our invention relies on what may be called indicial signaling modalities (described below) for associating a mobile device with a vending machine.

For the second problem (how to enable payment from devices), proposed solutions assume or posit an underlying business model couched in technical terms. For example, the Patel invention above assumes that a customer has prepaid credit for VM payments. The Earning Invention (WO Pat. No. 2018/190770) posits a vending server, not just as a technical artifact, but as a business platform and/or clearing house for VMs to handle customers' payments and credentials. This restricts the number of customers who are able to pay a given VM.

Motivation for Our Invention

VMs span a wide range: some dispense gold bars in Dubai airport, some open a pit toilet for a quarter in the wilderness of a national park; some conduct thousands of dollars of business a day, while others may get no business for days; some are in well-guarded crowded locations such as gaming arcades with access to reliable power and bandwidth, while others are unattended, exposed to elements and may run on batteries; some sell long-lasting items like soap and toothpaste, while others may sell perishables like coffee and sandwiches. Their profits and profit margins are vastly different, but their cost for the payment machinery is the same. A fixed-cost machinery for such a broad range of business scenarios is fundamentally unsustainable.

Yet, the single most prevalent payment solution for VMs today is the credit card reader, even though mobile payments can be cheaper for the operators and more convenient for payers. To understand why card readers are so dominant as a form of payment in VMs, it is important to understand the dynamics of VM's customers. Unlike a store, VMs are retail persona non grata with no identity and command no customer loyalty. They sell commodity items to customers who are in a hurry and do not have time or patience to read instructions, download apps or deal with proprietary quirks just to buy a soda. Hence, VM operators have opted for a universal, standardized solution like credit cards despite their disadvantages.

Our invention is motivated by the desire to make mobile VM payments a win-win for both VM operators and customers: it provides a technical solution applicable to a wide range of VMs; it does not subsume a business model; at the same time, by shifting the responsibility for payment from VMs to payers, it helps to reduce the capital and operating costs for VM operators.

SUMMARY OF THIS INVENTION

One class of embodiments cater to VMs that have a wide area data connection: customers or payers select what they wish to buy from the VM, identify the VM from their device (e.g., by scanning a QR code or entering the VM's ID), and pay for the purchase from their mobile device. After payment, the VM dispenses the selected products and/or services.

Another class of embodiments cater to offline VMs that have no data connection: customers or payers select what they wish to purchase from a VM or their device; the VM leverages the customer's device to send a coded message to its operator and to receive an authorization to dispense. In many embodiments, customers use a mobile application on their devices to login, store and retrieve their preferred forms of payment, set their language and currency preferences, and customize their payment experience, although it is also possible for a customer to pay from a browser-based interface anonymously. We will assume an app, and, toward the end, indicate how the same capabilities can be achieved with a browser interface.

FIG. 02A provides a high-level overview of our invention. In embodiments that cater to VMs that have a data connection, the VMs place their payment requests onto a payment bus that ferries the requests to the payers via their respective wide-area connections; payers pay for these requests in any way they please—with prepaid credit, credit card, bank transfer, PayPal etc., through a payment gateway of their choosing. After payment, the payers place a confirmation of their payment on the same bus to be ferried back to the VM, which then continues with its vending action. In embodiments that cater to offline VMs with no data connection, the VMs leverage the customer's device as their connection to the payment bus.

LIST OF FIGURES

FIG. 01 provides a high-level view of conventional vending machine payments.

FIG. 02A provides a high-level overview of our invention's payment model.

FIG. 06 provides examples of payment records in JSON representation.

Figure 7:
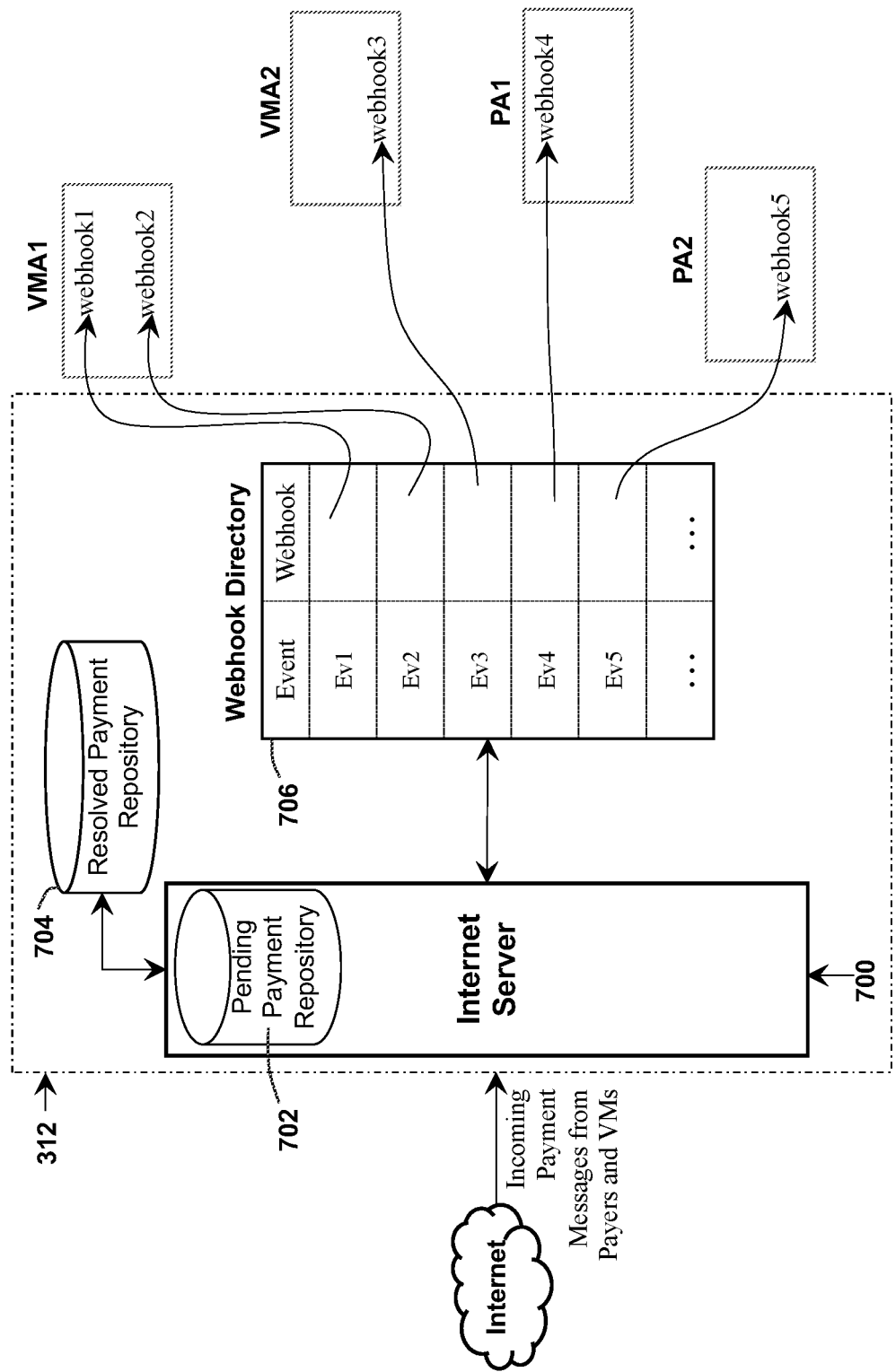

FIG. 07 depicts a Payment Bus implementation that uses webhooks.

Figure 8:
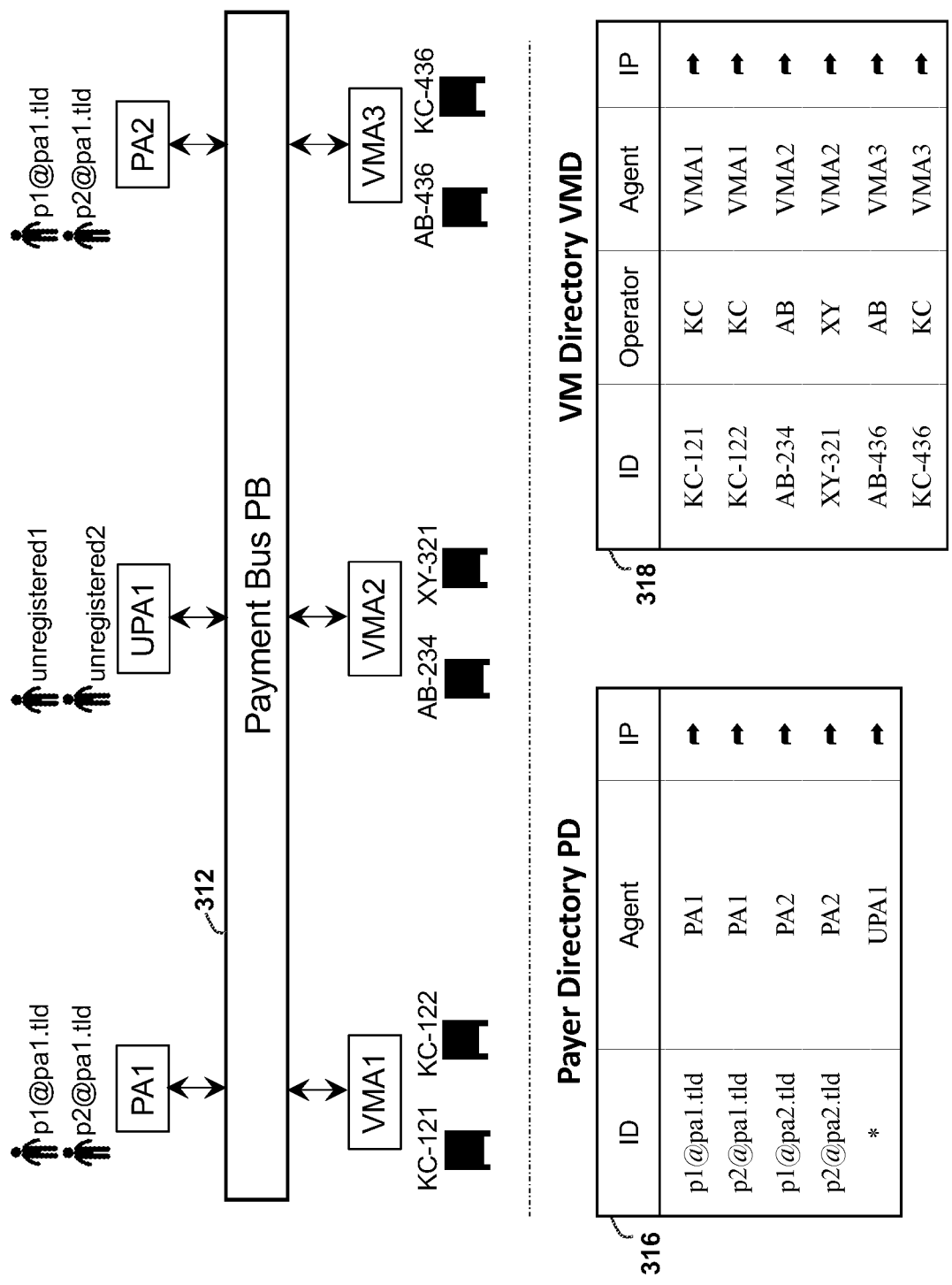

FIG. 08 depicts the address space structure of one of the embodiments of this invention.

Figure 9:
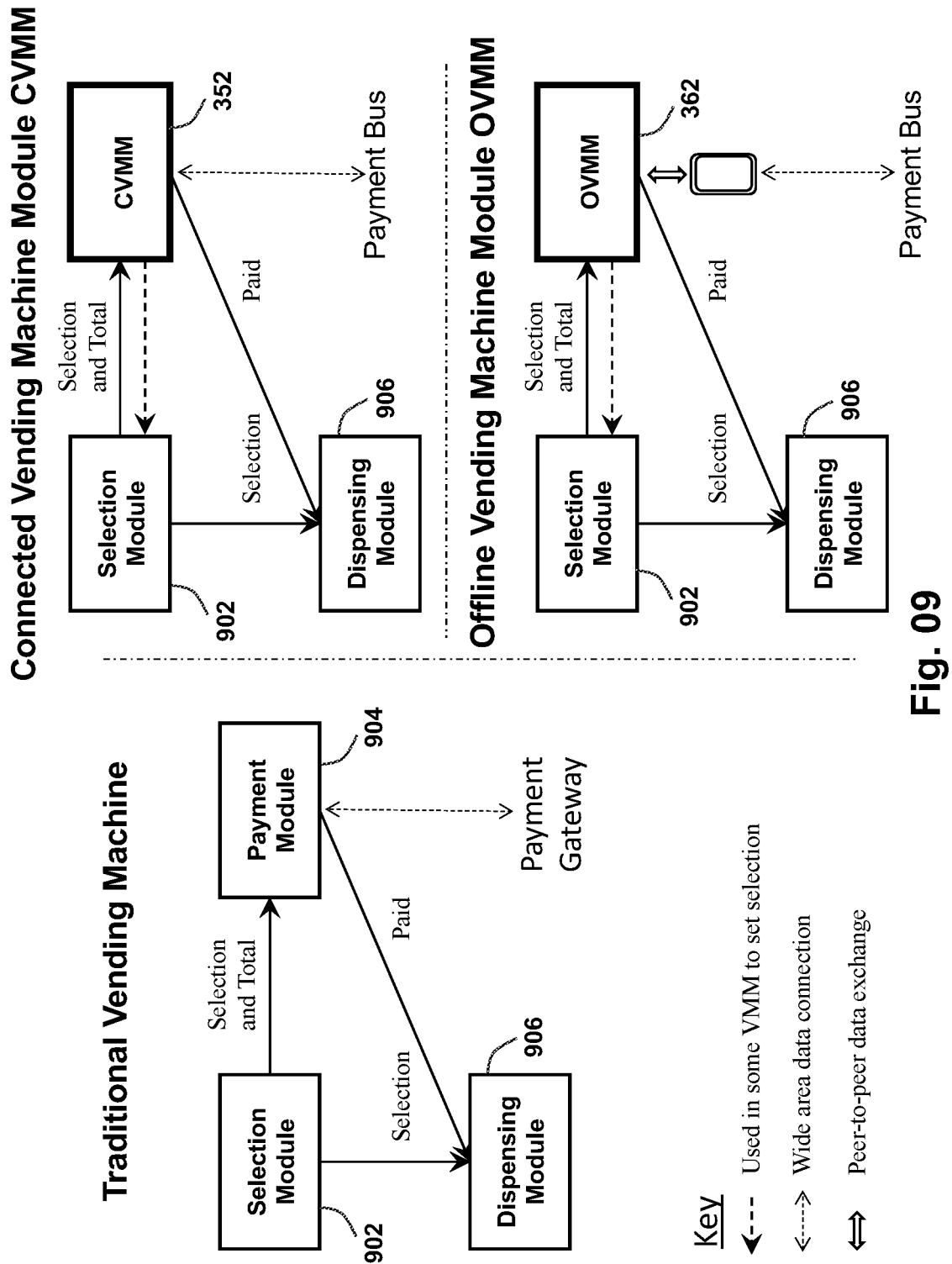

FIG. 09 shows a modular view of conventional VMs and how they connect to our VM modules.

Figure 10:
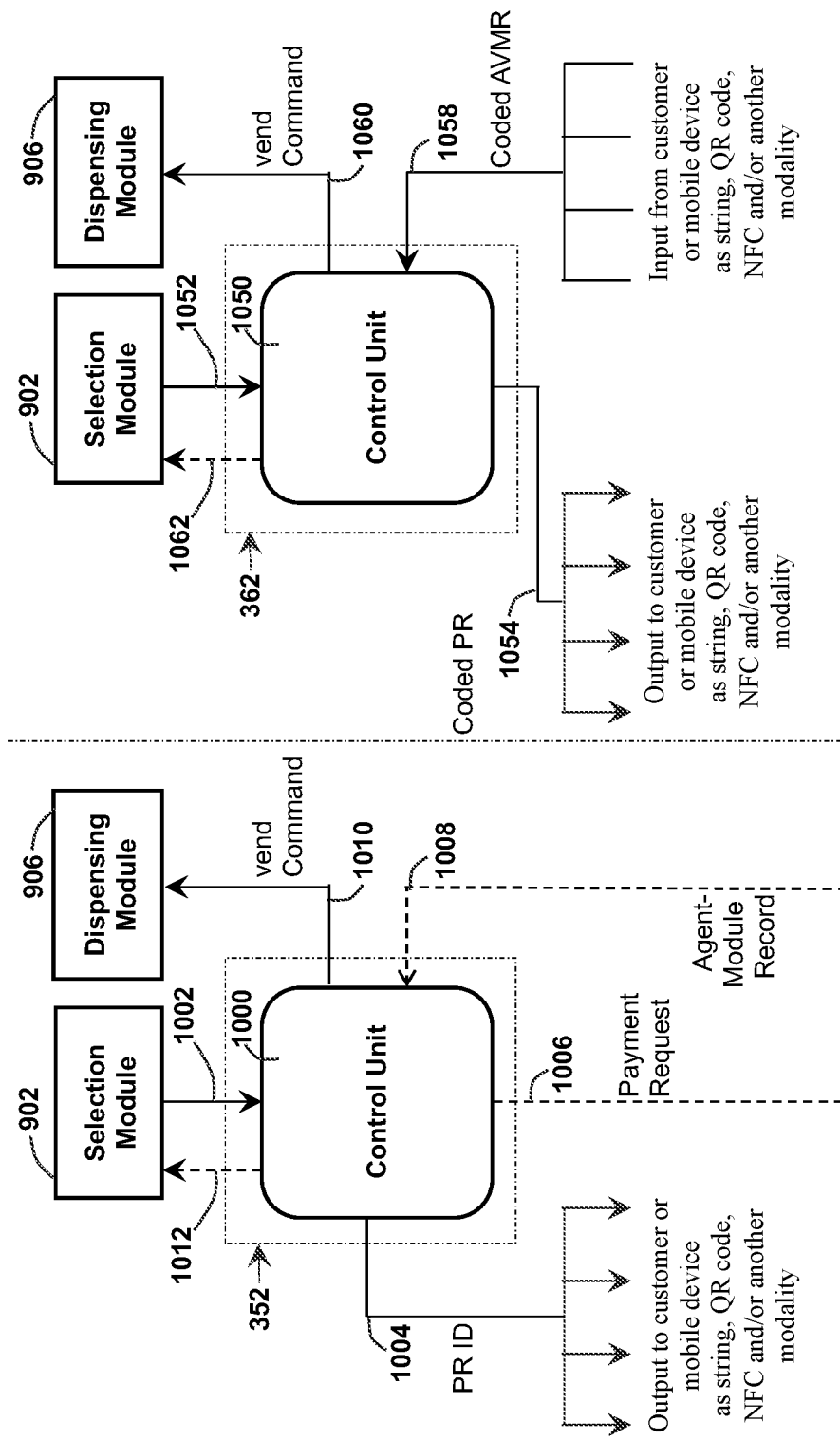

FIG. 10 shows schematics of Connected and Offline Vending Machine Modules.

Figure 11:
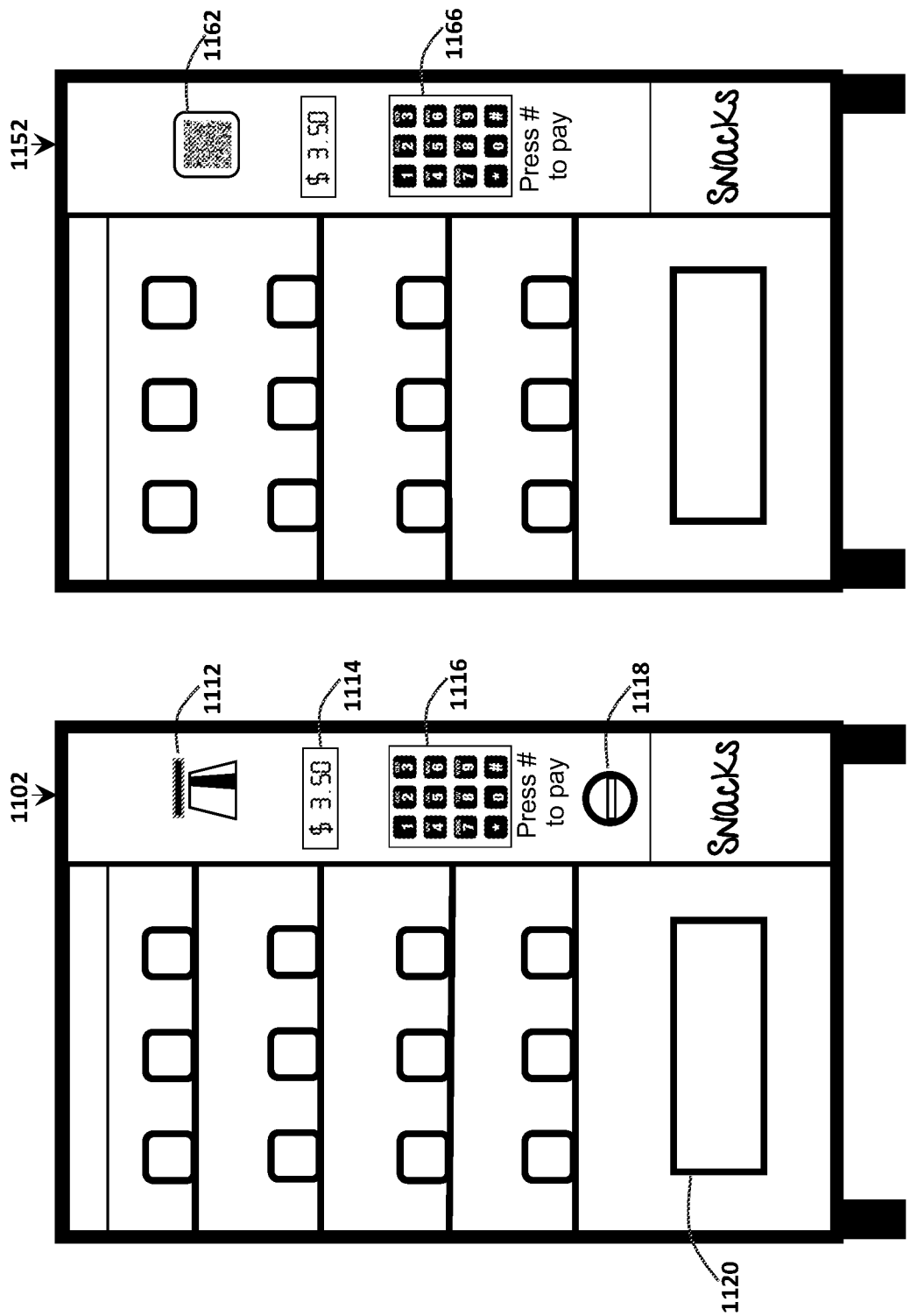

FIG. 11 shows a conventional and a modified VM.

Figure 12:
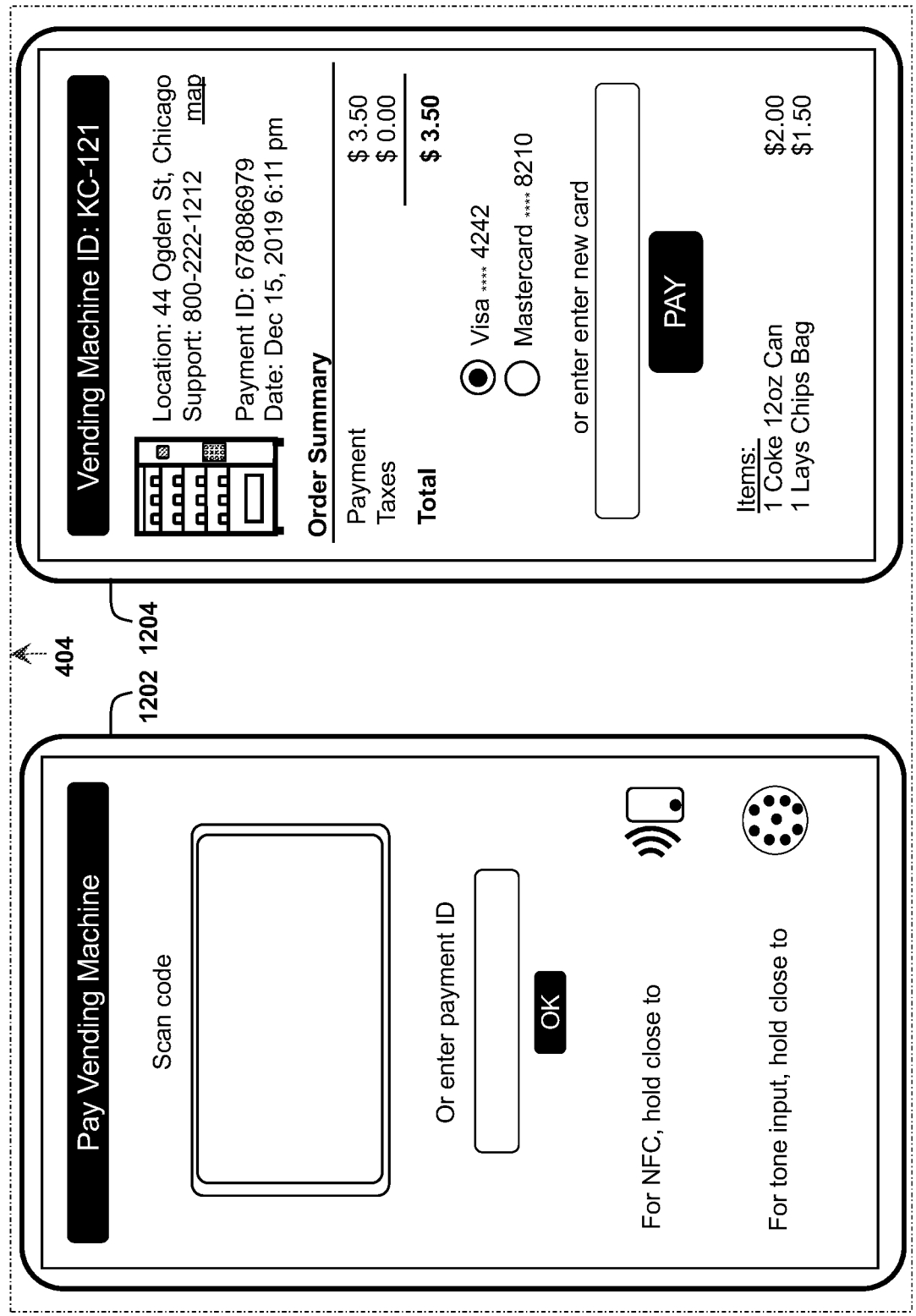

FIG. 12 shows two screens from the payment app served by the Payer Agent.

Figure 13:
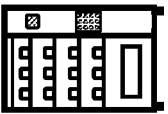

FIG. 13 shows an example VM profile.

Figure 14A:

FIG. 14A depicts the process flow for mobile payment from Embodiment E1.

Figure 14B:
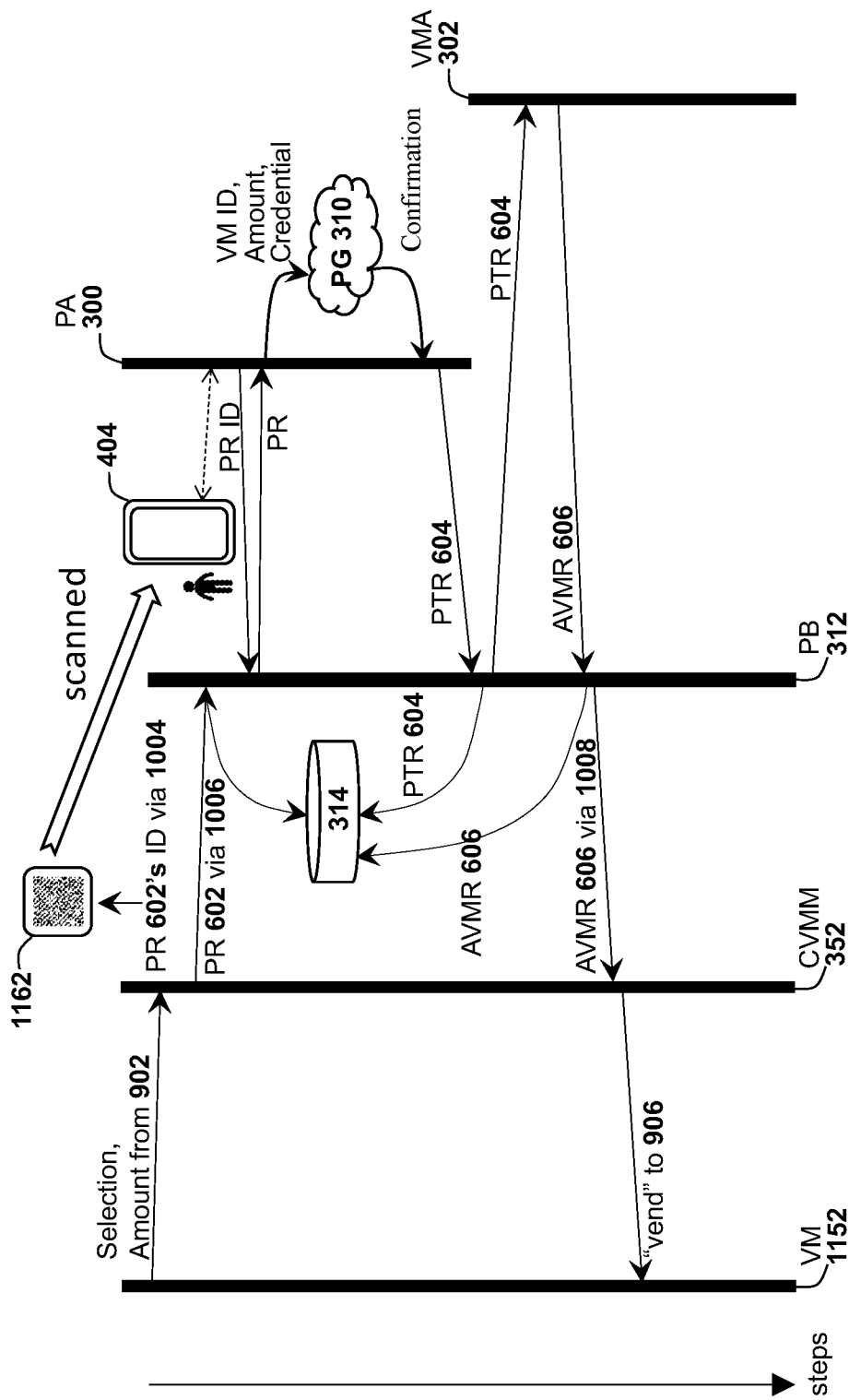

FIG. 14B depicts an alternate view of the process flow from E1 in terms of dataflow.

Figure 14C:
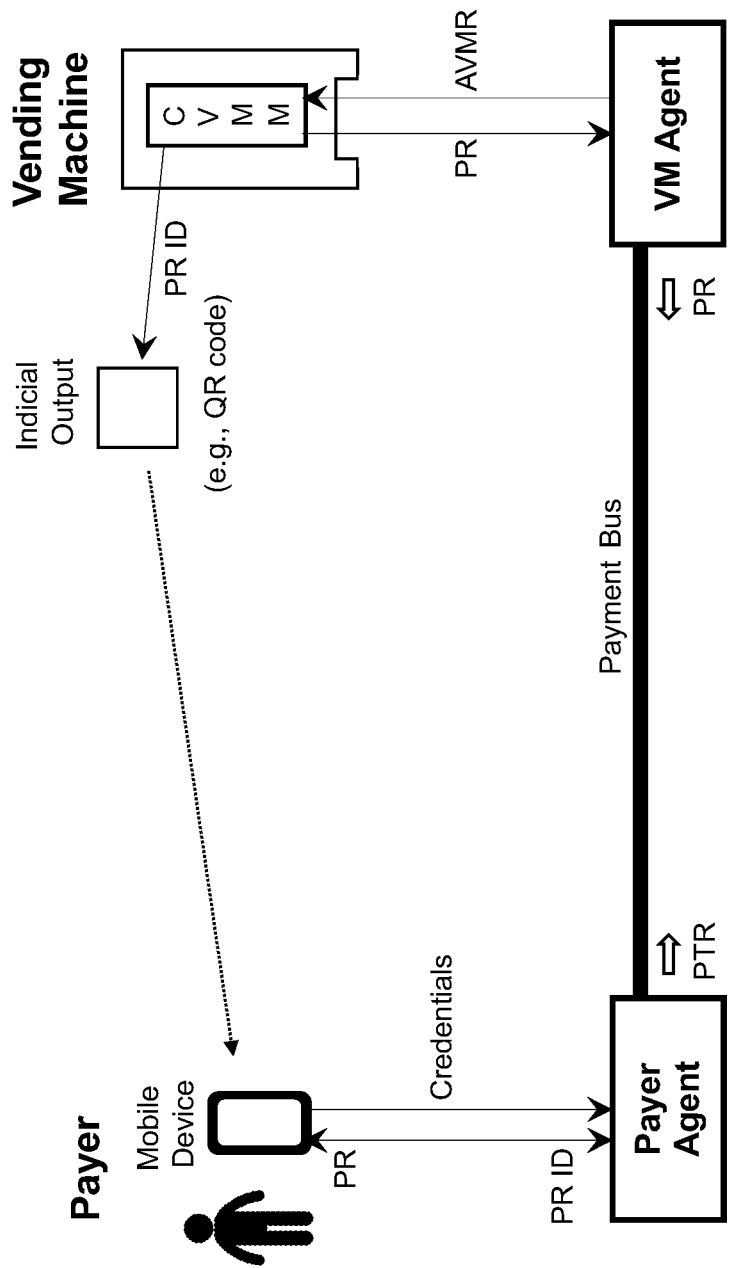

FIG. 14C depicts the interaction among the payer and the subsystems of our invention in E1.

Figure 15:
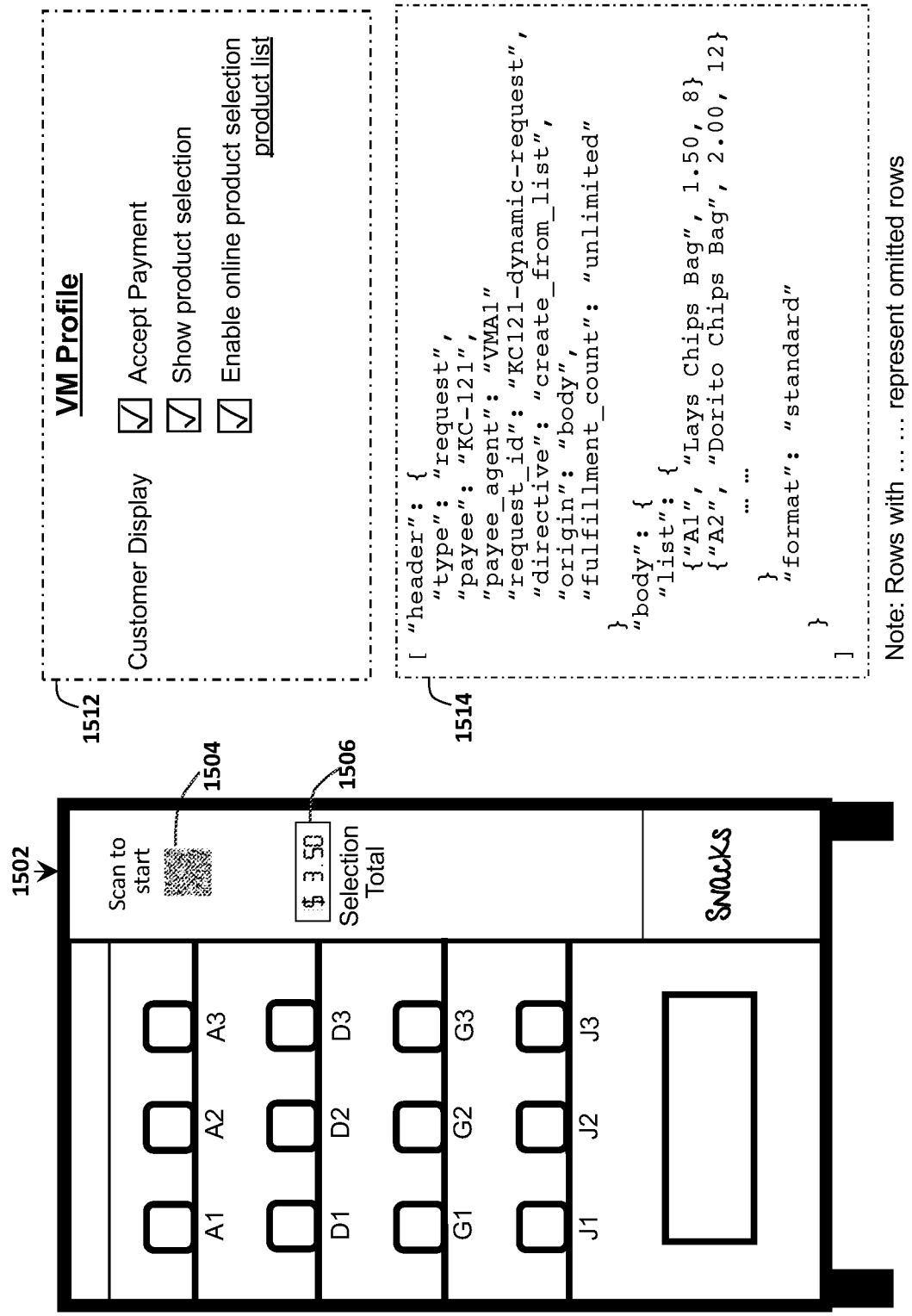

FIG. 15 depicts a VM, its profile, and the PR triggered by the profile for Embodiment E3.

Figure 16:
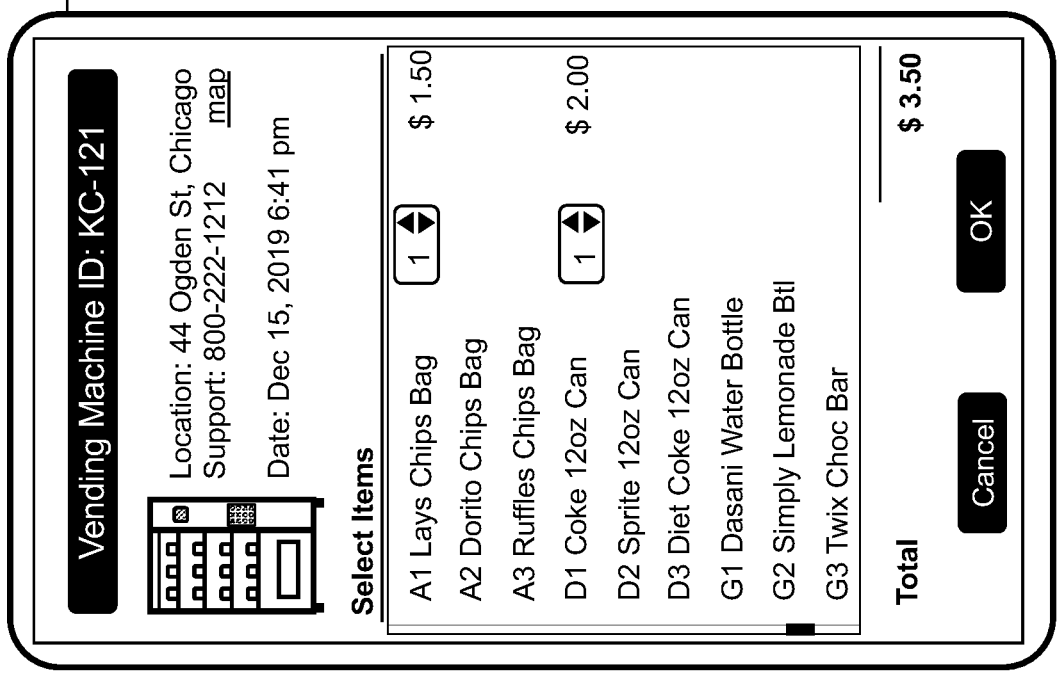

FIG. 16 shows the screen for offline selection for E3 and its PTR and AVMR.

Figure 17:
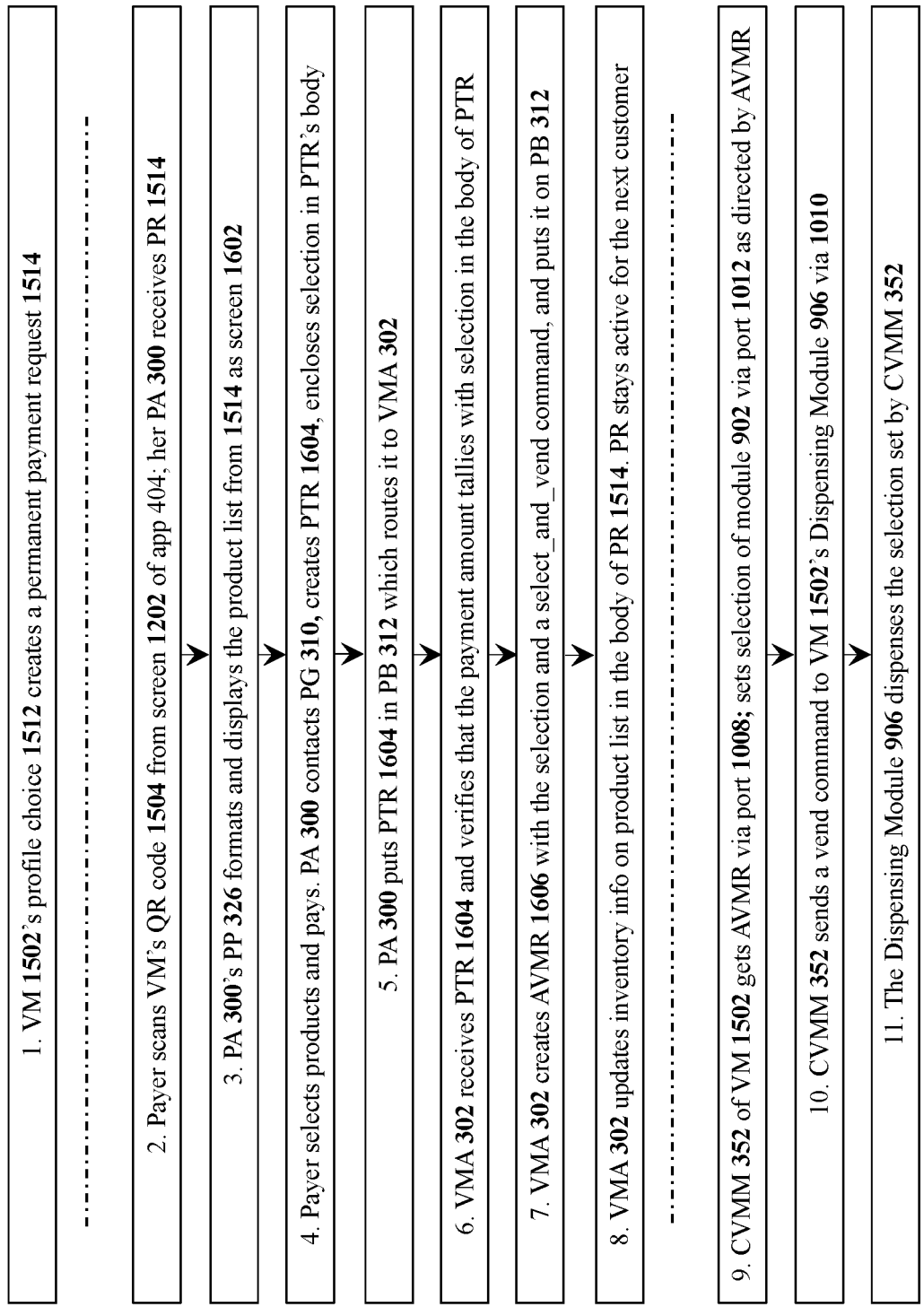

FIG. 17 depicts the process flow for payments from E3.

Figure 18:
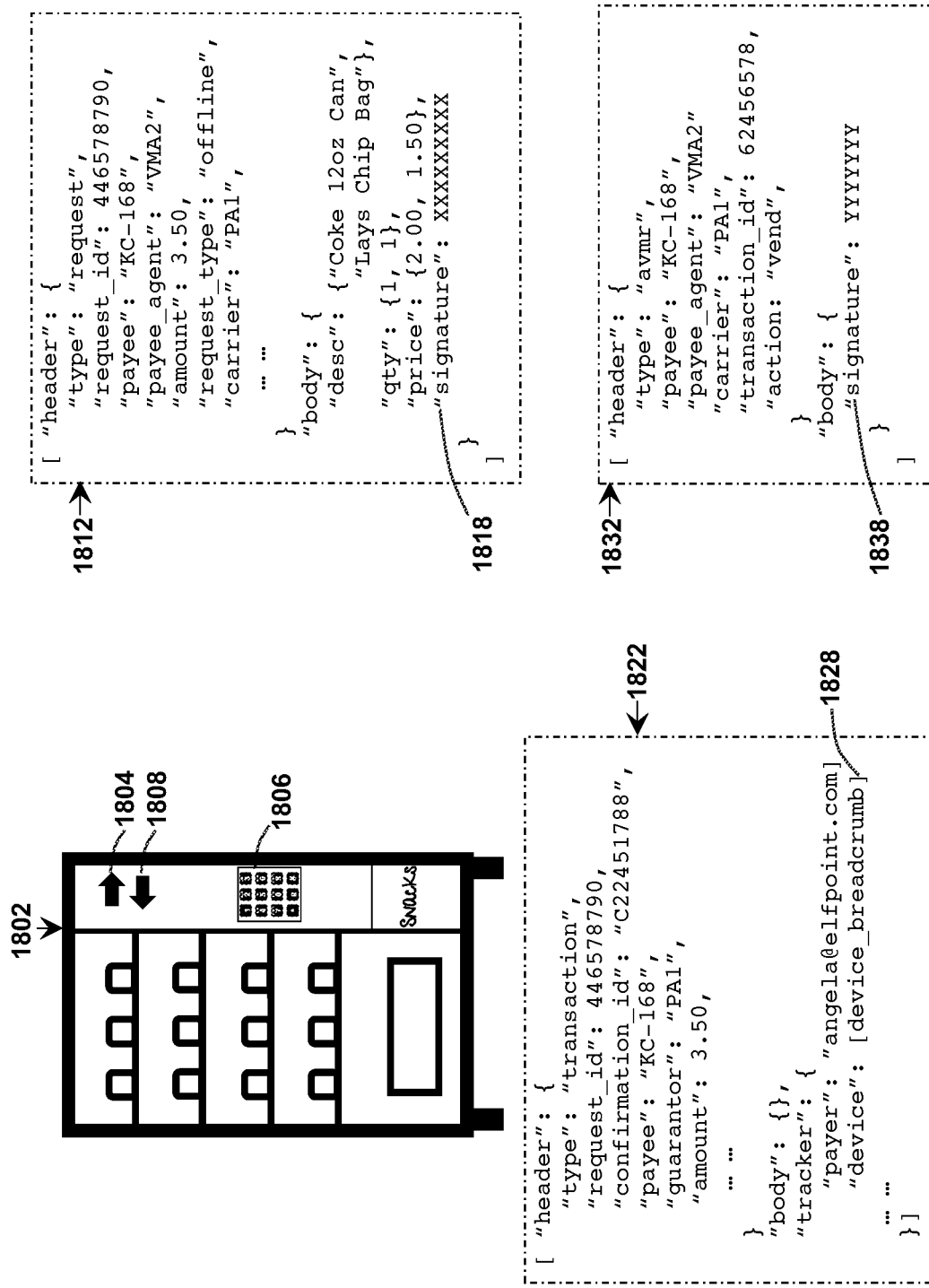

FIG. 18 depicts the VM, the PR, the PTR and the AVMR from Embodiment E4.

Figure 19:

FIG. 19 depicts the process flow for payments from E4.

Figure 20:
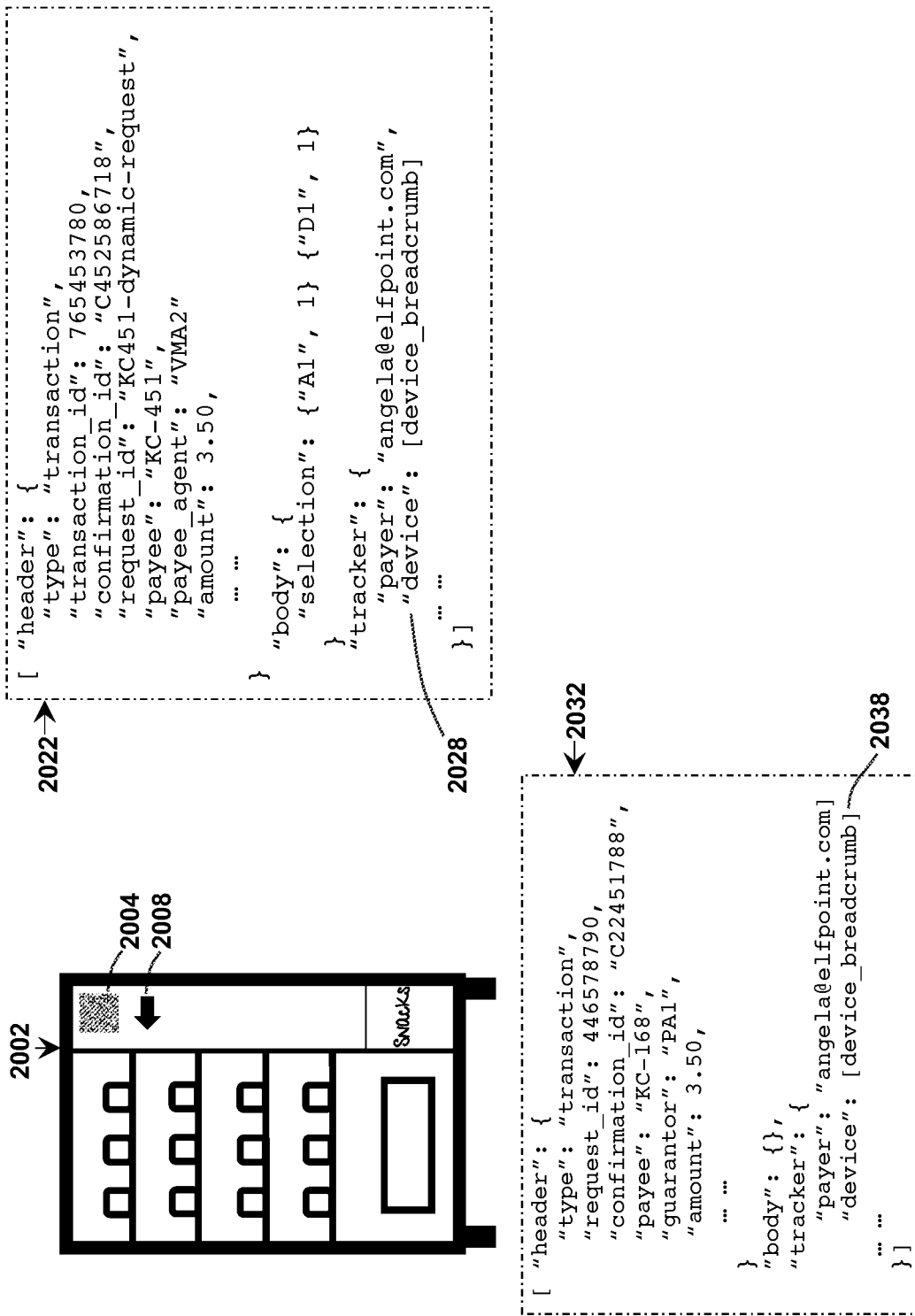

FIG. 20 depicts the VM, the PTR and the AVMR from Embodiment E5.

Figure 21:

FIG. 21 depicts the process flow for payments from E5.

DETAILED DESCRIPTION OF THE INVENTION

Figure 1:
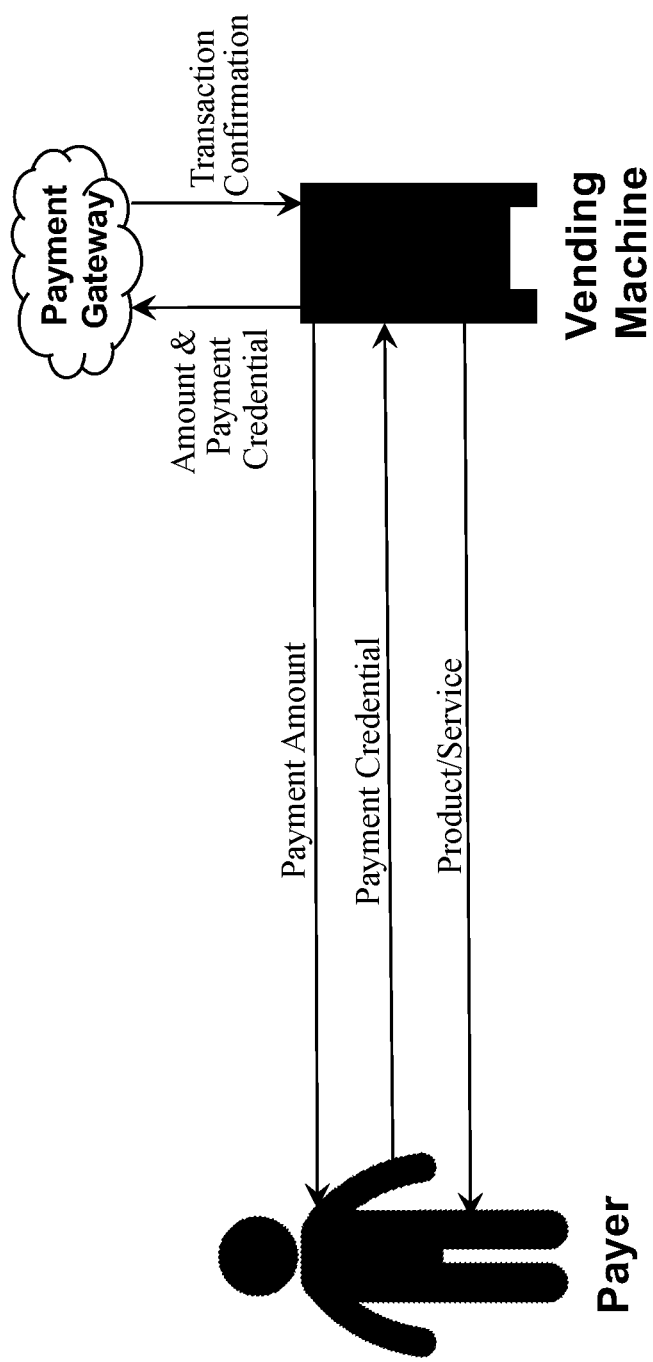
Figure 2A:
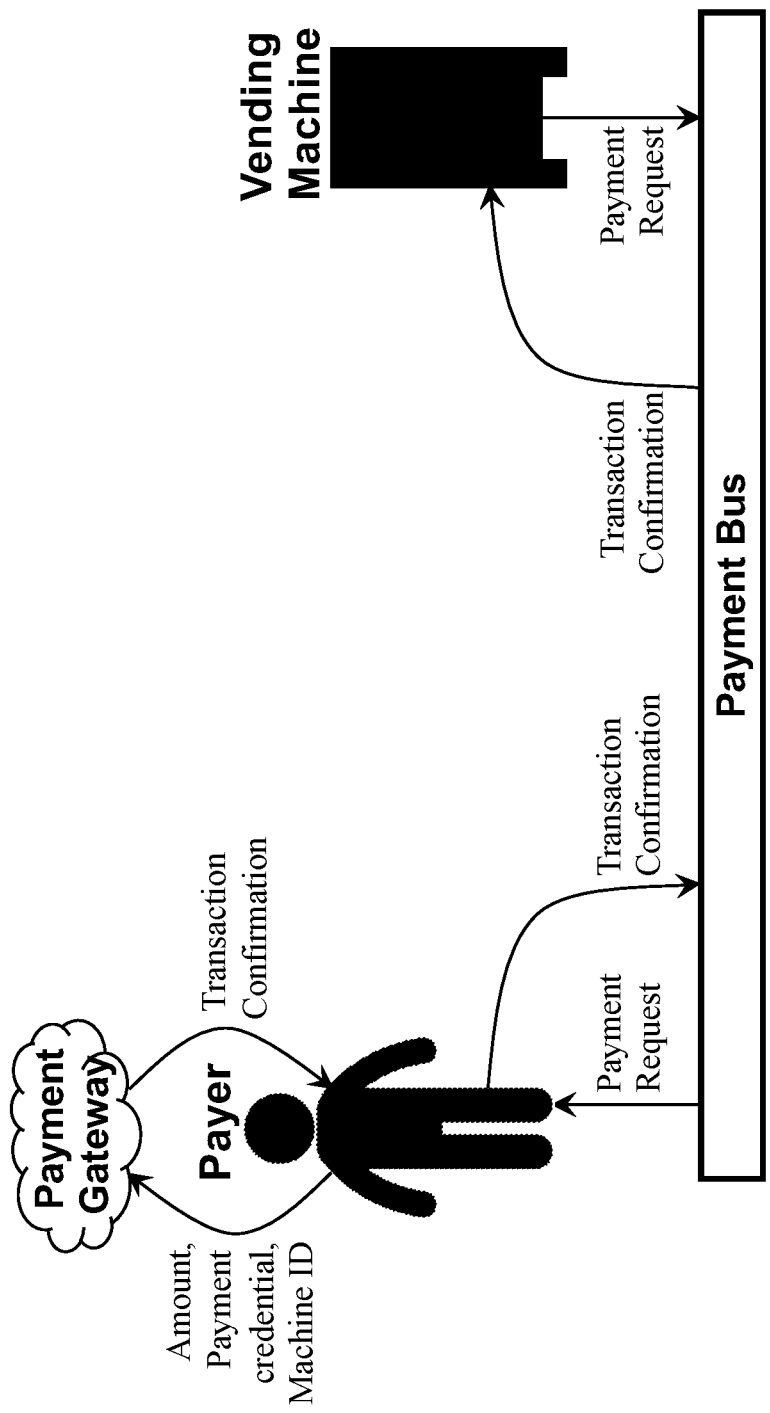
FIG. 02B depicts how our payment model is implemented through the help of agents.
Figure 2B:
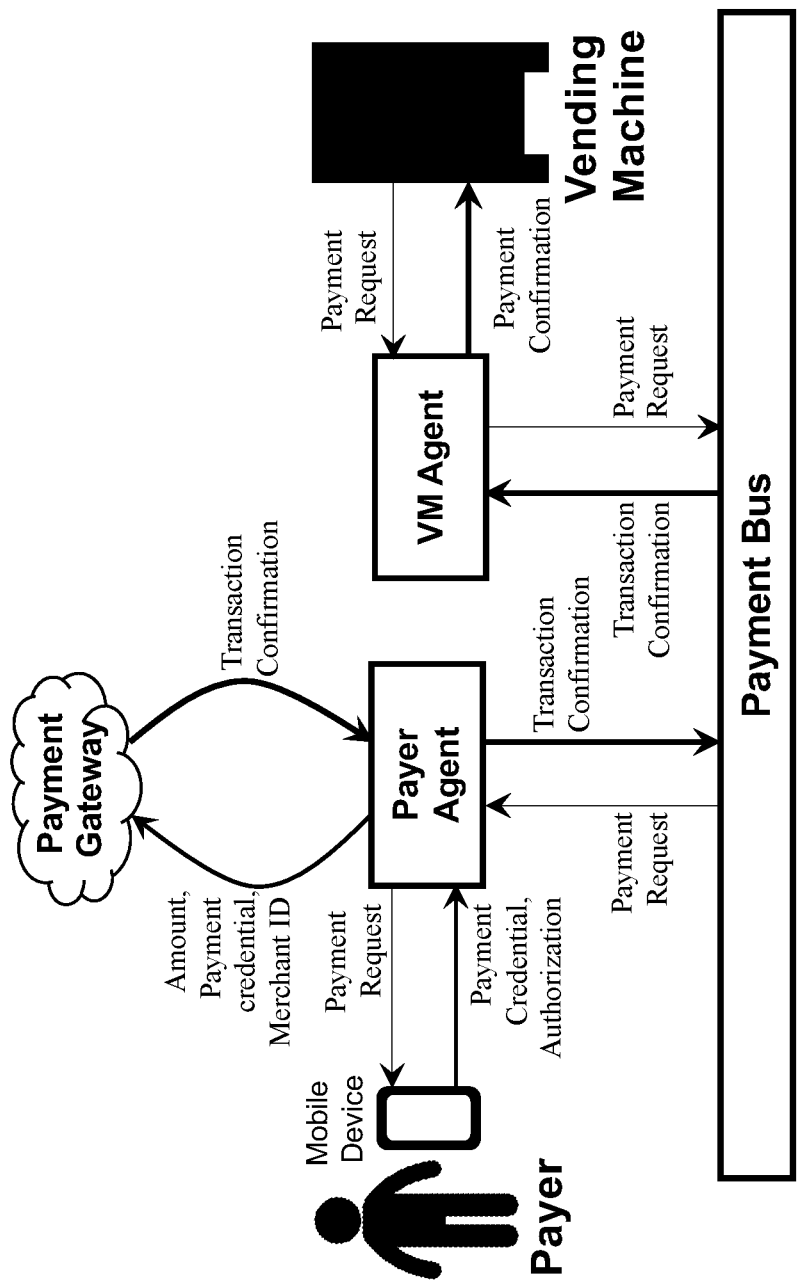
Figure 3:
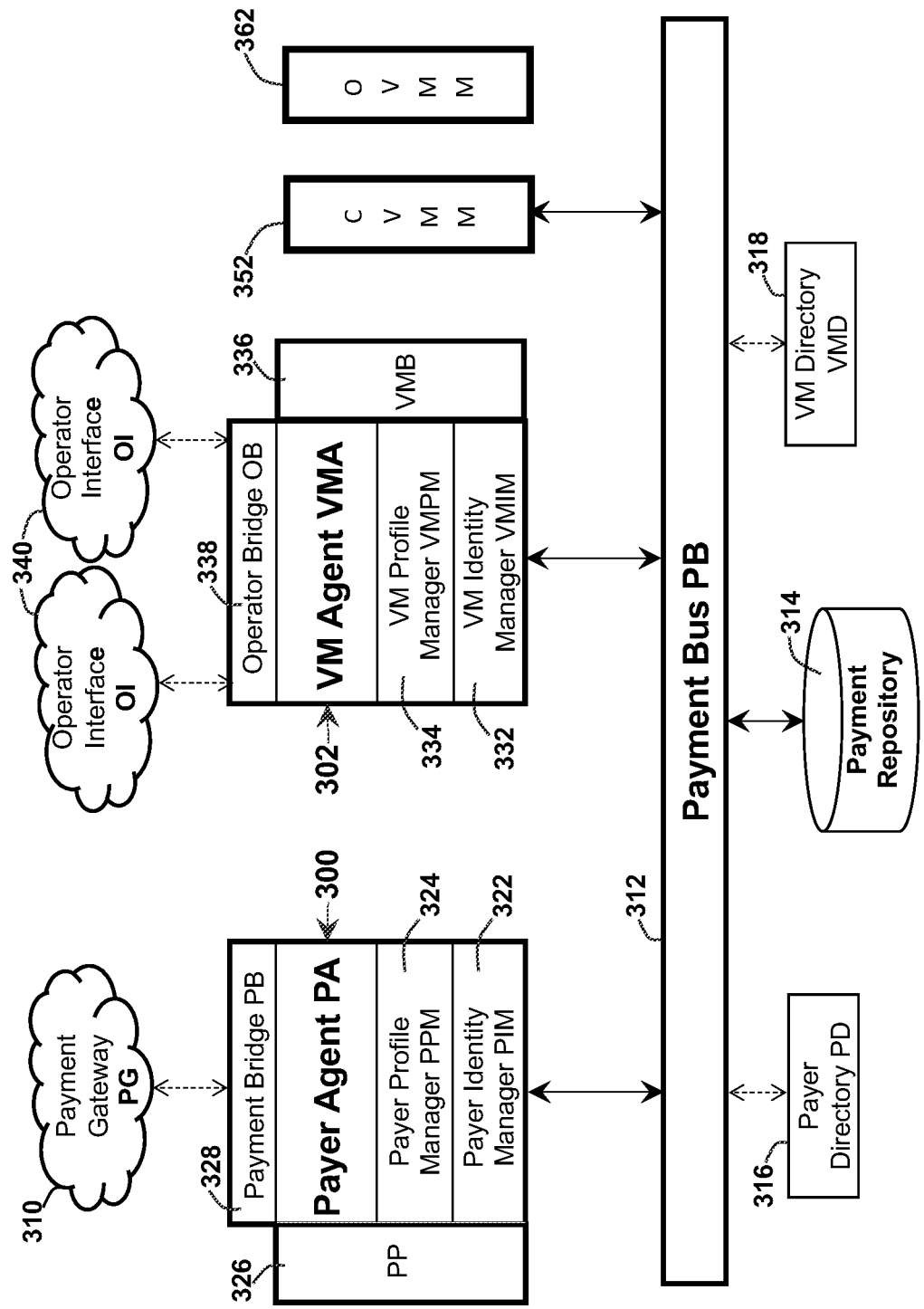
FIG. 03 is a schematic of the structure of our invention and its major components.

In FIG. 02A we provided a high-level overview of our invention. We now delve one level deeper to introduce payer agents and VM agents that simplify the design of our embodiments. The agents act on behalf of (and as proxy for) payers and VMs. They handle the mechanics of integration with the payment bus and payment gateways, the tedium of bookkeeping, authentication, and other low-level functions. FIG. 02B depicts a payment scenario from one embodiment: when a payer selects products from a VM, the VM sends a payment request to its agent and displays the request's ID as a QR code (we describe other modalities later). The VM's agent places the request in the payment bus. When the payer scans the code with her mobile, the payer's agent retrieves the request by ID from the bus and displays it in the payer's device. The payer can enter a payment credential. The payer agent contacts a payment gateway to complete the payment and places a payment transaction record confirming the payment in the payment bus. The bus ferries it to the merchant agent who verifies the transaction, credits the merchant, and sends a command to the VM, which can now continue with its vending action.

Structure of the Invention

Our invention, embodiments of which we refer to as Payer-centric Payment Systems or PCPS, comprises the following subsystems:

1. one or more Payer Agents PA 300; a given PA 300 acts as an agent for one or more payers managing all aspects of a payer's interaction with the PCPS,
2. one or more Vending Machine Agents VMA 302 that act as vending machines' backend servers; a given VMA 302 acts as an agent for one or more VMs managing all aspects of a VM's interaction with the PCPS,
3. a Payment Bus PB 312; acts as a store-and-forward conduit that enables parties connected to the PCPS to exchange payment messages with each other,
4. a Payment Repository PR 314; acts as the storage cache of PB 312. Some embodiments have separate Active Payment Repository and Resolved Payment Repository while others may store them as different tables in the same repository,
5. a Payer Directory PD 316; a logical directory of the identities of all payers recognized by a PCPS. In some embodiments it may be physical and explicit; in others, it may be defined by routing tables and payer identities maintained inside payer agents,
6. a VM Directory VMD 318; a logical directory of the identities of all VMs recognized by a PCPS embodiment. Like PD, a VM Directory may also be explicit or implicit,
7. one or more Connected Vending Machine Modules CVMM 352; a CVMM is a modularized interface for a VM to connect to the PCPS and the payer. CVMMs have wide-area data connection to PB 312, and 8. one or more Offline Vending Machine Module OVMM 362; an OVMM is a modularized interface for a VM to connect to the PCPS and the payer; OVMMs do not have data connectivity but leverage the payer's device to connect to PB 312.

Payer Agent (PA 300)

Figure 4:
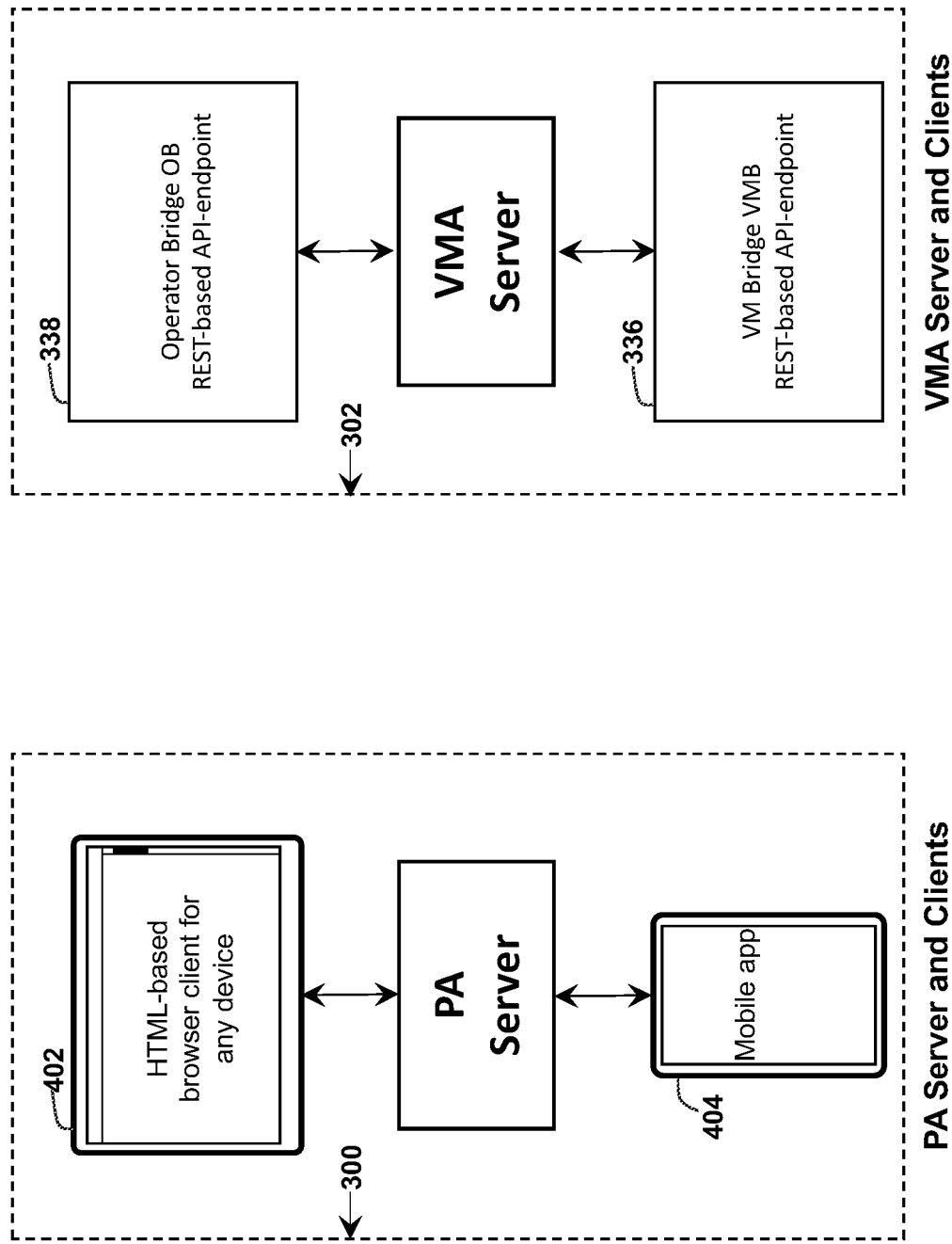
FIG. 04 depicts the technical architecture of payer agents and merchant agents.

A payer registers with a PCPS embodiment through a Payer Agent PA 300 which may be implemented as a combination of a webserver serving a standard HTML browser client 402 and/or a mobile app 404 (FIG. 04). The PA is responsible for providing all capabilities that enable that payer to interact with the PCPS. These include, but are not limited to, registering and authenticating the payer, retrieving and presenting payment requests for that payer, managing and that payer's payment sources and accounts, completing payments for that payer, depositing that payer's completed payment transactions into PB 312 etc.

PA 300 is assisted by four major subcomponents: Payer Identity Manager PIM 322, Payer Profile Manager PPM 324, Payment Presenter PP 326, and a Payment Bridge PB 328. PIM 322 is responsible for managing a payer's account including registering and authenticating a payer, imposing proper access policies, and ensuring no unauthorized parties access a payer's resources within the PCPS. PPM 324 manages the payer's profile including the payer's payment credentials and system preferences which include, but not limited to, the payer's display preferences, language and currency preferences, multi-factor authentication preferences etc. Payment Bridge PB 328 is an abstraction layer between PCPS and third-party Payment Gateways PG 310, so that a PCPS is loosely coupled to the internal details of payment gateways. In some embodiments, the PB 328 is implemented as a set of drivers for a range of payment gateways such as Stripe, PayPal, Payment Tech etc.

Figure 5:
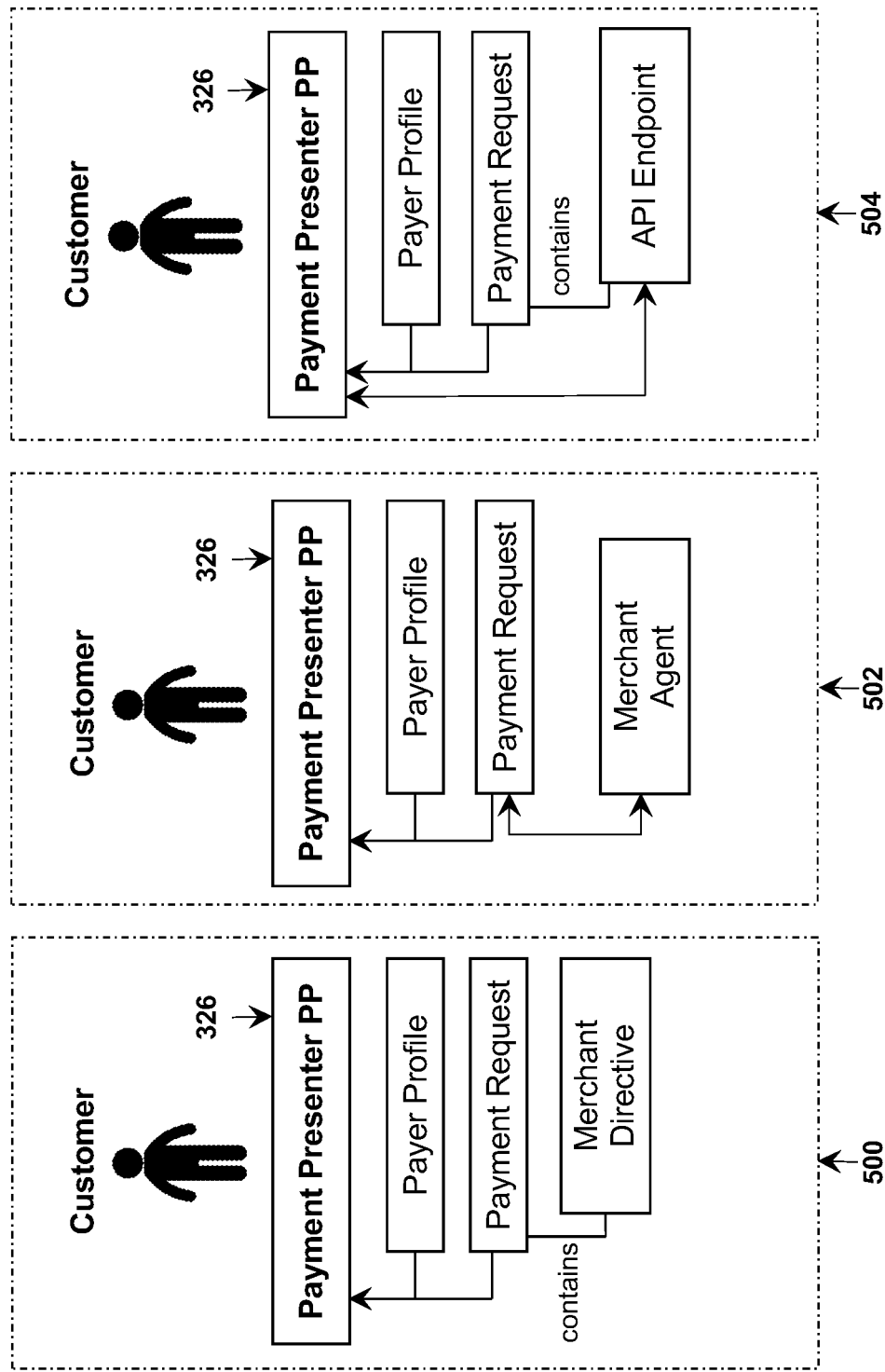
FIG. 05 shows different architectures for the Payment Presenter to interface with the merchant.

Payment Presenter PP 326 formats and presents a payment to a payer. Since the payer's device is rendered through the payer's agent PA 300 and not by the VM, our invention makes allowance for the VM to provide input on how the payment is to be presented to the payer. A VM can provide input through its profile (described later) as well as through the payment request itself. FIG. 05 is a schematic showing some architectures for PP 326 to obtain directives from VM (or VM Agent) in presenting its payment requests to payers. The approaches shown are illustrative, not exhaustive. The simplest approach is 500 where the payment request itself includes VM directives in its body. 504 depicts flexible, but more complex approach where the request includes an API-endpoint (potentially controlled by the VM operator) that PP 326 can call in order to render parts of the payment screen. 502 is another approach where PP 326 retains control but takes directions in real-time from the VMA 302. Embodiments provide examples.

Vending Machine Agent (VMA 302)

To avoid going into the business of VMs and how they are owned and/or operated, we treat VMs as equivalent to merchants: i.e., as first-class objects that have unique IDs and are authenticable. A VM registers with an embodiment through a VM Agent VMA 302 which may be implemented as a webserver serving two API-endpoints VM Bridge VMB 336 and an Operator Bridge OB 338 (FIG. 04). VMB 336 acts as VMA 302's API interface to VMs. OB 338 acts as VMA 302's API interface to Operators and their IT systems.

VM Agent VMA 302 is responsible for providing all capabilities that enable a VM (and its operator) to manage its account with a PCPS and to accept payments through the PCPS. These include but are not limited to authenticating the VM, placing the VM's payment requests into PB 312, notifying the VM of payments by a payer, managing communication between the VM, VM Modules (see below) and the VM operator. VMA 302 is assisted by a VM Identity Manager VMIM 332 and a VM Profile Manager VMPM 334. VMIM 332 manages the authentication and authorization of a VM (and its operator) in connecting to the PCPS and accessing various resources. The VMPM 334 manages the profile of a VM. A VM's profile enables the VMA to know the capabilities of the VM and how to handle its payment requests; it may also have directives for the Payer Agent PA 300 on how to display payment requests from that VM. FIG. 13, which we will revisit later, is a screenshot of a VM profile.

Payment Bus (PB 312) and Payment Repository (PR 314)

Payment Bus PB 312 serves four functions that are critical to a PCPS. First, it acts as a data conduit within a well-defined name or address space in which VMs, registered payers and payment messages all have unique identities by which they can be referenced and retrieved. As such, VMs—working through different VM agents, possibly controlled by different Operators—can request and obtain payment confirmation from payers—working through different payer agents, possibly controlled by different companies. A merchant or payer can switch agent (and new agents can join a PCPS embodiment) without affecting the payment flow.

Second, the payment bus externalizes a payment request as a persistent object on Payment Repository PR 314, so the payment request is no longer dependent on the VM for its fulfillment. This enables VMs to leverage the payer's device as their payment machinery.

Third, PB 312 acts as an event and data bus that delivers payment messages to concerned parties as and when the messages arrive. This helps maintain a synchronous payment flow across the PCPS, without the agents polling a central repository or maintaining point-to-point contact.

Fourth, PB 312 is a store-and-forward pipe that delivers payment messages on demand. Hence it is tolerant of system and network failures; further, externalization with persistence means that a payment request can be created by a VM and (later) "claimed" by a payer.

As such, the Payment Bus PB 312 provides an open infrastructure for an "internet of payments" that enable any VM to accept payment from any payer through any payment service. We have kept the payment bus intentionally simple so it can be a very general: it acts as a synchronous store-and-forward and as an (asynchronous) on-demand retrieval mechanism for payment messages. It is stateless, so agents have to manage state through their payment records.

Implementing the Payment Bus

In a simple embodiment with just one payer agent and one merchant agent, both residing on the same server, PB 312 can be implemented as a relational database for storing the payment messages and an event bus to broadcast any changes to the database: the agents subscribe to the event bus as listeners and are notified of database events, and they respond to events that concern them. While not very scalable or secure, this may be adequate for a simple PCPS if the messages are few and the agents are fully trusted.

For an embodiment that has several PAs 300 and VMAs 302 spanning hundreds of servers, PB 312 can be implemented as a distributed system with webhooks to deliver events and data to PAs and VMAs. See FIG. 07 for a webhook-based design: PB 312 comprises an Internet server 700 that has an in-memory database 702 for active payment requests, and a distributed NOSQL database 704 for resolved payment requests and payment transaction records. Merchant Agents and Payer Agents register specific webhooks—i.e., URLs that accept HTTP POST messages—for various events that concern them. When a payment message arrives, the server 700 stores the message, looks up what event the message triggers, and then sends a HTTP POST with that message to the webhook registered for that event in the Webhook Directory 706. While we have described two solutions, many other technologies can support an Internet-wide payment bus PB 312. REST hooks, Websockets, Pub-Sub, Server Sent etc. are some possibilities.

Payment Messages or Records

The information that flows through PB 312 are called messages or records. One embodiment implements three types: Payment Requests PR, Payment Transaction Records PTR, and Agent-to-VM Records AVMRs. While records are structured objects within PA 300, MA 302, and VM Modules CVMM 352 and OVMM 362, they are serialized with respect to PB 312. We note that serialization is the conversion of a structured object into a standards-based representation so that it can be transmitted from one system to another. In some embodiments, the records are serialized into JSON (JavaScript Object Notation, an established standard), though any serialization standard can be used. PRs are used by VMs and their agents to request a payment, PTRs are used by payers and their agents to confirm a payment, and AVMRs are used by VM agents and the VMs—or more precisely, VM modules—for exchanging information. PRs, PTRs and AVMRs are important but not exhaustive. In this document, we describe many scenarios supported by just these three. Other embodiments may use more record types for scenarios such as refunds, deposits, credit holds etc. We expect a range of record types to emerge as new types of financial instruments and vending models emerge in the payment industry.

All record types have a header and a body; specific record types may have other fields and subfields. Although different embodiments may have different header fields with different semantics, within a given embodiment, the header fields have well-understood semantics so that they can be parsed and processed by the payment bus, payer agents and merchant agents. The body is aimed at allowing payers, VMs and their operators in exchanging arbitrary information about the payment. The body is not processed by the bus; it may also be encrypted.

The fields and values in the headers are unrestricted though many embodiments recognize the following fields: type, request_id, transaction_id, AVMR_id, payee, payer, payer_agent, payee_agent, amount, currency, timestamp, exp, status, guarantor, origin, fulfillment_count, confirmation_id, carrier, directive, request_type etc. The fields directive, carrier and fulfillment_count cater to non-standard scenarios that we will discuss under embodiments.

FIG. 06 shows examples of PR, PTR and AVMR in JSON format. PR 602 means: this message is of type "request," it has an id, it is from a VM "KC-121" whose agent is a "VMA1" and the requested amount is 3.50 USD; it has a timestamp and an expiration, and that it is presently "active." The body contains details for the payer or payer agent. PTR 604 means: this record is of type "transaction" confirming a payment of 3.50 USD; it is a payment toward a payment request from VM KC-121; the payment has a confirmation ID and is guaranteed by PA1 which is also the payer agent. The body is empty. The tracker would be encrypted so it is intelligible only to PA 300; it contains the payer ID, the name of the gateway and payment source used. Note that this information would not be intelligible to the VM or VMA. When VMA 302 receives PTR 604, it would verify that the request_id and the amount in the PTR tallies with request_id and amount in the PR. If the PTR has a confirmation id and a guarantor, VMA 302 would change the status of the PR from active to paid. A record that is no longer active (because it is paid, expired or abandoned) is considered resolved.

With a communication channel between a payer's mobile device and the VM Agent VMA 302, much of the VM-payer interaction logic can be implemented in the VM's agent (which typically commands more computing power and network resources than an isolated VM). The Agent-VM Record AVMR allows for this possibility. AVMR 606 above means: it is from a certain agent to a VM's module sent at a certain time to execute the "vend" action for a specific payment request; its body contains other commands for the VM to execute.

Payer Directory (PD 316), VM Directory (VMD 318) and Address Space

An address space—also called a namespace—defines the context within which the identity of some entity is defined and where the entity is uniquely addressable. For example, a filesystem in a computer is an address space that uniquely identifies each file within a hierarchical directory structure; the Domain Name Service (DNS) of the Internet defines a highly distributed and hierarchical address space in which any domain, subdomain or a webpage is uniquely addressable. For smooth payment flow in a PCPS embodiment, the PCPS must provide an address space in which VMs can be identified so that payers can address and pay the right VM and the right VM may be credited with the payment. In many embodiments, payers may also be explicitly identified for storing and retrieving their payment credentials, user preferences, account management and other enhanced features such as promotions, loyalty programs and so forth. In simple embodiments, the address space may be nothing more than a flat, PCPS-wide directory of VMs, ensuring that their IDs are unique at registration time. If the embodiment has only one payer agent and only one VM agent, the agents' respective identity managers would also be the logical Payer Directory 316 and the logical VM Directory 318. If there are multiple payer agents and merchant agents, then the union of their respective PIMs and MIMs would constitute the logical payer and merchant directories with an additional check at the time of registration to ensure that payers or merchants do not have duplicate registrations across agents.

A hierarchically organized address space is more common and scalable. FIG. 08 is a schematic of an address space from one our embodiments. Assume that PA1, PA2 and UPA1 are payer agents PA 300; VMA1, VMA2 and VMA3 are merchant agents VMA 302. PA1 and PA2 register their payers by giving them IDs that are email IDs that belong to their respective domains pa1.tld and pa2.tld. UPA1 is a payer agent that caters to unregistered payers and enables them to pay anonymously. In this embodiment, the IDs of VMs consist of two-character prefixes that indicate their operators' IDs; the operators in turn assign unique numerical IDs to VMs that they operate. Assume that the agents are fully trusted objects within the PCPS. In this embodiment, the logical payer directory is the union of payer IDs of all the PIMs 322; the logical VM directory is the union of all VMs belonging to the various operators. However, for efficiency this embodiment has consolidated, physical directories PD 316 and VMD 318 (FIG. 08, bottom).

Why have many PAs and VMAs? Our invention aims to provide an open infrastructure for VM payments and does not subsume any particular business model. We imagine that different agents will cater to different market niches, geographies or different class of payers and machines. For example, one VM agent could cater to VMs of a certain type while another may cater to only VMs of a particular operator. Similarly, one PA may cater to payers paying with prepaid credit, another to payers paying with PayPal, and another may specialize in discounts and coupons. Our invention is agnostic about the underlying business dynamic.

It is not just the payers and merchants who are uniquely identifiable, but also the messages they send to each other. Since all messages pass through the Payment Bus 312, in some embodiments, it is most efficient to assign an ID to messages when they first reach the bus. In others, each merchant agent and payer agent may assign an ID that is unique within that agent's address space, and prefix it with that agent's ID, so that the message's ID is unique in the PCPS.

Connected and Offline VM Modules (CVMM 352 and OVMM 362)

As depicted in FIG. 09 (left), VMs may be thought of as having three distinct functional modules: (a) a Selection Module 902 that lets customers select items from the VM and perhaps totals up the payment, (b) a Payment Module 904 that accepts payment from the customer, and (c) a Dispensing Module 906 that dispenses items in the current selection on receiving a payment confirmation from the Payment Module. CVMM 352 and OVMM 362 (FIG. 10) are modular components that replace the Payment Module of a traditional VM so that the VM can communicate with, and accept payments from, a PCPS. CVMM 352 communicates with the PCPS via a wide area data connection; OVMM 362 leverages a customer's mobile device to connect to the PCPS. In some embodiments, coding is simply attaching a digital signature of the sender to a PR or AVMR. Other embodiments use shared secrets, and timestamps as salts or nonces. The ultimate purpose of coding is to enable a recipient of a message to verify that the message was sent by a specified sender and has not been altered after it was signed.

A minimal implementation of CVMM 352 has a microprocessor control unit 1000; it has an input port 1002 to receive a selection from 902; on receiving a selection, it creates a payment request PR and sends it out through its wide-area port 1006 and sends the ID of the PR to the local port 1004; on receiving an AVMR through port 1008, it processes the AVMR and may send a "vend" command to Dispensing Module 906 via local port 1010. Enhanced versions of CVMM may also have a local output port 1012. On receiving an AVMR with a selection and a "select-and-vend" command via 1008, these CVMMs will send the selection to port 1012 and then send a "vend" command to 906 via port 1010. Embodiments provide examples.

A minimal implementation of OVMM 362 has a microprocessor control unit 1050; it has an input port 1052 to receive a selection from 902; on receiving a selection, it creates an encoded payment request PR and sends it to the local port 1054; on receiving an encoded AVMR record through port 1058, it processes the AVMR and may send a "vend" command to Dispensing Module 906 via local port 1060. Enhanced versions of OVMM may also have a local output port 1062. On receiving an AVMR with a selection and a "select-and-vend" command via 1058, these OVMMs will send the selection to port 1062 and then send a "vend" command to 906 via port 1010. Embodiments provide examples.

Indicial Interfaces and Indicial Input/Output

For a vending machine and a mobile device to interface, a number of modalities are available. At one extreme is a vending machine flashing some data and the user entering that data into their mobile device manually; at the other extreme is a wifi or Bluetooth connection between the two devices. The former is safe but cumbersome; the latter can be dangerous for reasons mentioned in the background selection: in public places with hundreds of machines wireless signals, not only is pairing between a device and a vending machine tedious, it can also open the device to rogue connections and malware.

We define an indicial interface or indicial input/output as any interface modality where a human can reliably ascertain the origin and destination of the interface. As such, a QR code, barcode, tone input/output etc. can be perceived by a human; NFC, while being invisible, is restricted by its extreme proximity requirement of a few centimeters. Although our invention is capable of supporting any type of interface between a payer's device and the vending machine, we believe indicial interfaces are most suited for most real-world payment scenarios by enabling a payer to identify the vending machine one intends to connect to.

Embodiment E1: Prototypical Payments for Connected VMs

FIG. 11 shows a conventional snack vending machine 1102 with a keypad 1116 for snack selection, an LED counter 1114 to show the payment amount, a coin slot 1118 and a card reader 1114 for payment, and a snack dispenser 1120. FIG. 11 also shows a modified version 1152 that is part of embodiment E1. In VM 1152, payment module 904 of the conventional machine has been replaced by a Connected Vending Machine Module CVMM 352; and the coin slot 1118 and the card reader 1114 have been eliminated and replaced by a QR code display 1162.

Imagine a customer Angela, a registered user of E1, selecting a snack and a drink from 1152 using keypad 1166. She finishes her selection by pressing the "#" key, and the Selection Module 902 sends her selection and payment amount to CVMM 352 via port 1002. Control unit 1000 of CVVM 352 creates (a) a payment request PR and sends it its VMA 302 of E1 which sends it to PB 312, and (b) sends the ID of PR to display 1162 via local port 1004.

FIG. 12 shows two screenshots from mobile app 404 that Angela uses to pay. The app is served by E1's Payer Agent PA 300 with which Angela is registered. She uses screen 1202 of app 404 to scan the QR code from display 1162. Since the QR code encodes the PR's ID, her agent can retrieve the PR via the payment bus PB 312. PA 300's Payment Presenter PP 326 generates the payment screen 1204 for the PR. Note that PP 326 gets Angela's payment sources from her profile, and information about the VM from the VM's profile (see FIG. 13). In this embodiment, as requested by the VM's profile, PP 326 displays the purchased items included in the body of the payment request. Note that both Angela's mobile device and CVMM 352 communicate with their agents through their respective (and independent) data connections. The only peer-to-peer interaction is when Angela scans the QR code from the VM's display 1162.

To fulfill the request PR, Angela can choose a credit card from her profile or enter a new card. Her chosen payment source and authorization are delivered by Angela's app 404 to her agent PA 300 which sends the payee ID and the payer's credentials to a Payment Gateway 310 through its Payment Bridge PB 328. PG 310 authorizes payment and returns a confirmation. Note that the payment source doesn't have to be a credit card but anything that the payer agent supports—e.g., prepaid credit, bank transfer, PayPal etc.

Once payment is completed, PA 300 creates a Payment Transaction Record PTR 604 (FIG. 6) with a reference to the request ID. PA 300 deposits the PTR in Payment Bus PB 312, which the bus routes to VMA 302. VMA 302 sees that the PTR confirms a transaction for a PR from one of its VMs, so VMA 302 verifies that the payment amount in PTR matches the amount in PR and that PTR has a confirmation code and a guarantor. Satisfied, VMA 302 changes the status of PR as from "active" to "paid" and creates an AVMR 606 for CVMM 352 of VM 1152 with a "vend" command to vend the last customer selection and puts the AVMR on PB 312. CVMM 352 receives AVMR 606 (via port 1008) and sends a vend command to the Dispensing Module 906 of VM 1152 via port 1010. FIG. 14-A is a pictorial depiction of the steps that E1 goes through to execute the payment scenario above. FIG. 14-B provides an alternate depiction of the steps in terms of process flow: VMA 302, CVMM 352, PB 312, and PA 300 are shown left to right and the sequence of process steps from top to bottom. FIG. 14-C provides yet another view of the interaction between the customer and the components of E1.

E1 Variations: In the description above, we discussed one modality—QR code via display 1162—through which the VM's CVMM 352 communicates a payment request ID to the customer. We note that any other indicial modality through which a short alphanumeric code can be communicated either to the customer or the customer's device will work equally well: a low-end VM may use a cheap LED to flash the payment request ID and have the payer enter it manually into her device; a high-end VM may use an NFC transmitter to send the ID directly to the user's device. The inputs and outputs in FIG. 10 and inputs on app 404's screen 1202 of FIG. 11 suggest some other indicial modalities that may be appropriate depending on the situation.

Embodiment E2: Payment for a Connected VM Based on Static VM ID

VM's are typically synchronous—i.e., the last payment corresponds to the last selection and a selection has to be paid for or canceled before a new selection can start. In other words, there can be only once active payment request at a time. Hence, a user can access the payment request simply by knowing the ID of the VM. In E2, imagine a VM that is similar to VM 1152 but without a display. Instead, the static ID of the VM is painted as a QR code on the VM's body itself. A customer can simply scan the static QR code of the VM with her app 404 and the payer's PA 300 can retrieve the most recent payment request created by that VM. Thus, the cost of the VM can be further reduced by eliminating the display for a payment request ID.

Embodiment E3: Payment for a Connected VM with Online Interactions

With a data connection between the payer's mobile and the payment bus as well as the VM and the payment bus, it is now possible to eliminate much of the buttons and controls from the VM and have the payers interact with a VM through their device. FIG. 15 shows VM 1502 that is part of E3. VM 1502 is similar to 1152 except that its keypad and QR display have been eliminated; it simply has its VM ID painted on it as a static QR code. Further, its CVMM 352 also has an output port 1012 for the CVMM to set the selection of the Selection Module 902.

In FIG. 13, we briefly saw how a VM's profile can specify options that enable a payer agent to tailor a customer's mobile display. One of the options was to enable product selection. VM 1502 chooses this option (see 1512, FIG. 15). This triggers the creation of a special kind of a payment request by 1502's VM Agent 302, shown as 1514 of FIG. 15. This PR has a directive for a payer agent to dynamically create a payment request from a list at the specified origin, namely, the body of the PR itself. The list is in some standard format with price and inventory.

When a customer scans QR code 1504 imprinted on VM 1502 and the customer's PA 300 sends it to the payment bus, the bus sees that it is a static VM ID and sends the most recent (and only) payment request from that VM to PA 300. Based on the directive in 1514, PA 300's PP 326 extracts the product list from the body of the PR and displays it as in 1602 of FIG. 16. When the customer makes her selection and clicks OK, PP 326 displays a payment screen similar to 1204 of FIG. 12. When the customer pays, PA 300 creates a payment transaction record PTR 1604 with a reference to the PR's ID, adds the product selection to the PTR's body, and places it on E3's bus PB 312, which routes it to the VM's agent VMA 302. As in E1, VMA 302 recognizes that it is a PTR for its payment request PR 1602, so it (a) verifies the selection in the PTR's body against the payment, (b) creates an AVMR 1606 with a "select-and-vend" command, adds the product selection to the AVMR's body, (d) places it on PB 312, and (d) adjusts the inventory in the product list in the body of PR 1514 to account for the sold items. Since 1514's fulfillment count is "unlimited," it stays as an active (and only) request for VM 1502 to be scanned by the next user.

CVMM 352 of VM 1602 receives AVMR 1606 from PB 312 through its data connection 1008. Since the AVMR specifies a selection, CVMM 352 uses its output port 1012 to set the selection of 902 to the items in the body of the AVMR (one unit of product A1 and one unit of product D1). This is tantamount to the payer choosing these items through the keypad in VM 1152. Once the selection is set, CVMM 352 issues the "vend" command to the Dispensing Module 906 which dispenses the selection. FIG. 17 depicts the process flow of the scenario.

Embodiment E4: Payment for an Offline VM with Offline Selection

We now describe two embodiments that enable VMs that have neither payment machinery nor wide-area connections to accept mobile payments by using our Offline Vending Machine Module OVMM 362 that leverages the customer's device to communicate with its VM Agent through the payment bus. In E4, the customer selects products from the VM and pays from her device; in E5, the customer performs both product selection and payment from her device.

FIG. 18 shows an offline VM 1802 that is similar to a conventional VM except that its Payment Module 904 has been replaced by OVMM 362. To interface with the customer's mobile device, VM 1802 has an indicial output device 1804 and an indicial input device 1806 that are connected, respectively, to OVMM 362's output port 1054 and OVMM's input port 1058. For high-end VMs, the output and input devices may be an NFC transceiver; for low-end VMs, they may be a QR transceiver that displays a QR code for a mobile device to scan; and a QR code scanner to scan a QR code from the device's display. Let us assume that VM 1802 has an NFC transceiver. We now describe VM 1802's process flow as depicted in FIG. 19:

1. Angela, a registered user of E4, selects a snack and a drink using VM 1802's keypad 1806. When she finishes her selection, the Selection Module 902 of 1802 sends the selection and payment amount as input to OVMM 362 via port 1052.
2. OVMM 362 creates a coded PR 1812 (FIG. 18) which comprises the PR for Angela's selection as well as a digital signature (shown as a series of 'X's in FIG. 18) of the vending machine based on a shared secret between the vending machine and the VM Agent VMA 302. This enables the VMA 302 that the PR is indeed from the VM and has not been altered in transit. Note that shared secrets are set up at the time of installation.
3. OVMM 362 sends the coded PR 1812 to VM 1802's output device 1804. As one familiar with the art will know, any data can be converted to an NFC signal or QR code.
4. Angela taps VM 1802 with her mobile device which transfers PR 1812 to her device via NFC and is captured by her app 404 of her Payer Agent PA 300. PA 300 asks Payment Presenter PP 326 to present the PR to the customer as in 1204 in E1.
5. Angela authorizes payment and her PA 300 contacts PG 310 to get a confirmation.
6. PA 300 creates PTR 1822 to confirm the payment. Since this request was captured from an OVMM and PA 300 carried it from the user's device, it marks itself as the carrier of the PA (so that VMA 302 will know how the PR got to it) and drops it into PB 312. It also adds a breadcrumb in the PTR's tracker field so that it knows how to get a "vend" message from the VMA back to this user device. (The breadcrumb is typically the payer_id plus any device id or address in case the user is logged in at multiple devices).
7. PA 300 now drops PTR 1822 into the payment bus PB 312. As with any PTR, the bus routes PTR 1822 to its designated VM Agent VMA 302. Since PTR 1822 confirms payment for PR 1812, VMA 302 retrieves PR 1812, sees that it is from one of its client OVMMs, verifies the digital signature to ascertain that the PR has not been altered, that the payment amount in PTR 1822 tallies with amount reported by OVMM 362.
8. VMA 302 now creates an AVMR 1832 to instruct its client OVMM to vend the customer's selection in response to PTR 1822 (which was in response to PR 1812). To ensure that AVMR 1832 reaches the VM through the same payer and device, it designates the PA that carried PTR 1822 from the OVMM as the carrier for AVMR 1832. Further, it also adds its digital signature to AVMR's body so that the OVMM can verify that AVMR 1832 is indeed from VMA 302.
9. VMA 302 puts AVMR 1832 in PB 312 which routes it to PA 300 based on the carrier field. PA 300 sees that this AVMR is in response to PTR 1822. It retrieves PTR 1822 and gets the breadcrumb information to help direct AVMR 1832 to the right customer and device.
10. When AVMR 1832 gets to the payer's device, the payer's app 404 instructs the user to tap the device with VM 802. The payer does so and app 404 transmits the AVMR by NFC to VM 1802's input 1808.
11. OVMM 362 receives AVMR 1832 from 1808 via port 1058. It verifies the digital signature to ensure that the AVMR is from VMA 302.
12. As instructed by the AVMR, OVMM 362 now sends a vend command to VM 1802's Dispensing Module 906 which dispenses Angela's snack selection.

Although some of these process steps may seem complicated, a person familiar with the art will realize that much of the details are related to routing and session management since the payment bus PB 312 is stateless, so the messages have to link to each other in order to execute a stateful process or transaction. Once that is understood, the main problem that this embodiment addresses and solves can be summarized as follows: the PR and AVMR must be in plain text so that the payer's agent can interpret them; but the payer also has an incentive to cheat, so the OVMM and the VM agent need to know that the payer has not altered the message in transit.

Embodiment E5: Payment for an Offline VM with Online Selection

In E4, VM 1802 enabled product selection through a keypad, so that OVMM 362 just replaced the Payment Module 904. In E5, OVMM 362 replaces both Selection Module 902 and Payment Module 904 by combining aspects of E3 with E4. FIG. 20 shows VM 2002 of E5. Unlike VM 1802, VM 2002 does not have a keypad for product selection, nor an output device to send a coded PR. Instead, as in E3, it has a static QR code 2004 imprinted on it to identify the VM; and as in E4, it has an input device 2008 to interface with a mobile device. The input device can be an NFC receiver or a QR code scanner. Let us assume 2008 is an NFC receiver.

E5's process flow is depicted in FIG. 21. As in VM 1502 of E3, when VM 2002's profile is initialized, its agent creates a PR similar to PR 1514 (FIG. 15) with the VM's product list in the PR's body and a directive for the payer agent to create a dynamic payment request from that product list. When a payer scans the static QR code 2004 painted on VM 2002, the payer's PA 300 receives this PR, and its PP 326 presents it on the payer's device as in 1602. The payer selects products through her device and pays for it, and PA 300 contacts PG 310 to get confirmation. So far, the steps are identical to steps 1 to 3 of E3. The rest of the steps are below:

4. When the payer pays, PTR 2022 (FIG. 20) created by E5 is similar to PTR 1604 of E3, but it has device breadcrumb 2028 as in PTR 1822 of E4.
5. As with any PTR, PA 300 puts it on PB 312 which routes PTR to VM Agent VMA 302.
6. VMA 302 receives PTR 2022 and verifies the payment against the product selection in the body of the PTR (identical to E3).
7. In E3, the VMA could send a "select-and-vend" command directly to its CVMM 352, whereas, in E5, it has to depend on the payer agent and the payer to carry the command. It creates AVMR 2032 that has the characteristics of AVMR 1606 of E3 and AVMR 1822 of E4. As in E3, 2032 contains the product selection and a select and vend command; as in E4, it has the carrier field to route this AVMR to the right payer agent who will route it to the right user device; plus a digital signature so that OVMM 362 can be sure that the product selection and the command came from VMA 302.
8. As in E3, VMA 302 adjusts the inventory info in the PR which stays active for next user.
9. Through PB 312, AVMR 2032 reaches the payer agent (the carrier). Based on the transaction_id, PA 302 has access to the breadcrumb to the payer's device that paid for the transaction; PA 302 sends AVMR 2032 to the device's app 404.

10. Payer taps the device to the NFC receiver 2008 which delivers AVMR 2032 to VM 2002's OVMM 362 via port 1058. The OVMM sees that it is a select_and_vend command, verifies it is indeed from its VM agent VMA 302 through the digital signature 2038. Once satisfied, OVMM 362 uses its output port 1062 to set the selection to the items specified in the body of AVMR 2032.

11. It then sends a vend command to the Dispensing Module 906.

12. The dispensing module dispenses the snack in the selection—which are the ones the payer selected from her device.

In summary, E5 underscores the twin goals of our invention: to provide payers the option to pay a wide range of VMs belonging to different operators from payers' own mobile devices and to reduce the capital and operating costs for VM operators. As the reader will notice, VM 2002 has no selection module, keypad, card reader or data connection, yet is able to accept mobile payment from payers who can pay through a payment service of their choice.

Endnotes:

To keep our description simple, we assumed that the payer uses a native "app" on a mobile device. This is not strictly necessary, and the functionality described above can be delivered via a standard mobile browser as follows: most mobile platforms can scan a QR code from their camera and if the QR code is a URL, fetch that URL on the device's browser. So, QR code references in this document can be read as a reference to a URL into which the content is wrapped as a standard URL parameter. For example, a QR code for a request ID 12345678 can be a QR code for a URL "https://upa.tld?parameter=12345678." If scanned by an unregistered user, upa.tld can act as the user's agent; if scanned by a registered user's app, the app can throw away the URL part and just use the parameter part. More and more platforms are extending native device features to browsers, so we expect NFC to provide the same in the near future.

Recent versions of QR codes can encode as much as 22K bits of data and can also be concatenated with each other for encoding even more data. Our tests showed that most VM messages (including encrypted ones) were well under 12K bits. NFC can exchange between 8 and 32K bytes per message.

In the Background section, we expressed our reservations regarding wireless connectivity between devices and VMs. Our solution focuses on indicial inputs and outputs so that the payer can ascertain that they are indeed connecting to a VM they intend to connect to.

The broad definition of a digital signature is that it enables a recipient to verify that the message is from a specified sender and that it has not been altered. We use the term in that broad sense. We are agnostic about the specific digital signature algorithm. Some embodiments use hashing with a shared secret; others use predetermined codes between senders and receivers—techniques well-known in coding hotel room doors.

Glossary

| Term | Definition |
|---|---|
| API | Application Programming Interface. APIs enable computer programs to interact and exchange data with each other. |
| API endpoint | A named or addressable API that has a specific purpose. |
| Customer | Same as payer. |
| Digital signature | Any means by which the sender of a message enables the receiver to ascertain that the message is from a specified sender and has not been altered by an intermediary. |
| Embodiment | Refers to a combination of the VM, the VM modules, the payment bus, and the servers, clients and API endpoints of agents of this invention that collectively execute a payment scenario. |
| HTTP POST | One of the standard methods supported by the HTTP protocol. The POST method is used to submit some data to a web server usually causing a change of state or side effect on the server. |
| Indicial | We define an indicial signal as one where the origin/destination of the signal is clear to a person. An indicial input originates from a clearly ascertainable source and an indicial output is aimed to a clearly ascertainable destination. |
| JSON | JavaScript Object Notation: A data interchange standard from European Computer Manufacturer's Association (ECMA). The standard is also known as ECMA-404. |
| Merchant | Same as vending machine, VM or payee. |
| NFC | Near Field Communications is a technology for very-short distance wireless communication between two devices that use inductive coupling to exchange data. The range is typically under 5 cm, and NFC is used widely in contactless payments. |
| Payee | Same as merchant, VM or vending machine. |
| Payer | Same as customer. |
| Payment credential | A credit card number, bank account number etc. along with information such as expiration date, a CVC code or any other data needed to authorize a payment using that payment source. |
| Payment message | Same as payment record. |
| Payment Request | Abbreviated PR, a request for a payment, typically sent by a merchant to a payer. |
| Payment Transaction Record | Abbreviated PTR, a record typically created by a payer or payer agent to confirm a payment in response to a payment request. |
| Payment Gateway | A third-party service that clears card and other transactions with financial institutions, transfers money, and confirms a transaction. |
| PR | Without any other qualification, PR stands for payment request. References to Payment Repository are always qualified as PR 314. |
| PR 314 | Payment Repository 314. |
| PTR | Same as Payment Transaction Record. |
| QR code | Quick Response code, also called 2-dimensional bar code. |
| .tld | .tld stands for top-level domain and is a common convention used to represent some random domain, as in p1.tld. |
| Webhook | A website URL that accepts a POST request in the HTTP or HTTPS protocol. Webhooks are typically used to inform a web server of an event and/or pass data to a webserver. |

The invention claimed is:

1. A method for electronic payment to a vending machine from a mobile device operated by a customer of the vending machine, the method comprising:
   receiving by the vending machine, a selection of products and/or services for purchase by the customer;
   creating by the vending machine, a payment request for the selection, wherein the payment request designates the vending machine as the payee of the payment request;
   associating the payment request with the customer, wherein the association occurs through the exchange of identifying information between the vending machine and the mobile device, and wherein the identifying information comprises at least one item chosen from a group consisting of an identifier for the vending machine, an identifier for the payment request, and an identifier for the customer;

sending the payment request by the vending machine to a backend server of the vending machine via a wide-area network;

receiving by the mobile device, the payment request via an online payment bus, wherein the online payment bus is configured to be a communication channel for payment messages between customers and backend servers of vending machines, and wherein the mobile device receives the payment request based, at least in part, on the association between the payment request and the customer;

enabling the customer, via a user interface on the mobile device, to initiate a payment process for paying the payment request, wherein the payment process comprises:

making a payment to the vending machine through an online payment gateway using a customer-specified payment credential;

receiving a confirmation statement from the online payment gateway, wherein the confirmation statement indicates that the said payment has been successfully completed;

creating a payment transaction record comprising the payment request and the said confirmation statement; and sending the payment transaction record to the online payment bus;

receiving by the backend server, the payment transaction record via the online payment bus;

creating by the backend server, a command message instructing the vending machine to dispense the selection;

sending by the backend server, the command message to the vending machine via the wide area network; and dispensing the selection by the vending machine.

2. The method of claim 1, wherein the payment request is associated with the customer based on the identifier for the vending machine, and the mobile device receives the most recent payment request that designates the said vending machine as the payee.

3. The method of claim 1, wherein the modality for the exchange of identifying information between the vending machine and the mobile device comprises Barcode, QR code, NFC, RFID, and/or Bluetooth.

4. The method of claim 1, wherein the vending machine comprises the backend server, and the mobile device comprises a computer-implemented customer agent that performs actions on behalf of the customer.

5. The method of claim 4, wherein a payment repository for storing payment messages between the vending machine and the backend server plays the role of the online payment bus when the customer agent and the backend server are the same.

6. The method of claim 1, wherein the wide area network is connected to the online payment bus.

7. A method for electronic payment to a vending machine, wherein the vending machine does not require a wide-area network connection of its own, from a mobile device operated by a customer of the vending machine, the method comprising:

receiving by the vending machine, a selection of products and/or services for purchase by the customer;

creating by the vending machine, a payment request for the selection, wherein the payment request designates the vending machine as the payee of the payment request;

receiving by the mobile device, the payment request from the vending machine via peer-to-peer data transfer between the vending machine and the mobile device;

enabling the customer, via a user interface on the mobile device, to initiate a payment process for paying the payment request, wherein the payment process comprises:

making a payment to the vending machine through an online payment gateway using a customer-specified payment credential;

receiving a confirmation statement from the online payment gateway, wherein the confirmation statement indicates that the said payment has been successfully completed;

creating a payment transaction record comprising the payment request and the said confirmation statement; and sending the payment transaction record to an online payment bus, wherein the online payment bus is configured to be a communication channel for payment messages between customers and backend servers of vending machines;

receiving by a backend server of the vending machine, the payment transaction record via the online payment bus;

creating by the backend server, a command message instructing the vending machine to dispense the selection;

sending by the backend server, the command message to the mobile device via the online payment bus;

forwarding by the mobile device, the command message to the vending machine via peer-to-peer data transfer; and dispensing the selection by the vending machine.

8. The method of claim 7 further comprising: adding a digital signature to the command message by the backend server.

9. The method of claim 7, wherein the modality for peer-to-peer data transfer comprises Barcode, QR code, NFC, RFID, and/or Bluetooth.

10. The method of claim 7, wherein the vending machine comprises the backend server, and the mobile device comprises a computer-implemented customer agent that performs actions on behalf of the customer.

11. The method of claim 10, wherein a payment repository for storing payment messages between the vending machine and the backend server plays the role of the online payment bus when the customer agent and the backend server are the same.

12. A method for product selection for and electronic payment to a vending machine from a mobile device operated by a customer of the vending machine, the method comprising:

capturing by the mobile device, a unique identifier for the vending machine via peer-to-peer data transfer between the vending machine and the mobile device;

retrieving by the mobile device, from a server computer, a menu of products and/or services, along with their respective prices, offered for sale by the vending machine, wherein the retrieving is based, at least in part, on the unique identifier for the vending machine;

displaying the menu on the mobile device;

receiving by the mobile device, a selection of items from the menu for purchase by the customer;

creating, by the mobile device, a payment request for the selection, wherein the payment request designates the vending machine as the payee of the payment request and includes a payment amount, wherein the payment amount is based, at least in part, on the selection;

enabling the customer, via a user interface on the mobile device, to initiate a payment process for paying the payment request, wherein the payment process comprises:

making a payment to the vending machine through an online payment gateway using a customer-specified payment credential;

receiving a confirmation statement from the online payment gateway, wherein the confirmation statement indicates that the said payment has been successfully completed;

creating a payment transaction record comprising the payment request and the said confirmation statement, and sending the payment transaction record to an online payment bus, wherein the online payment bus is configured to be a communication channel for payment messages between customers and backend servers of vending machines;

receiving by a backend server of the vending machine, the payment transaction record via the online payment bus;

creating by the backend server, a command message instructing the vending machine to dispense the selection;

sending by the backend server, the command message to the vending machine via a wide-area network; and dispensing the selection by the vending machine.

13. The method of claim 12 further comprising: verifying by the backend server that the payment to the vending machine tallies with the selection's total price.

14. The method of claim 12, wherein the modality for peer-to-peer data transfer comprises Barcode, QR code, NFC, RFID, and/or Bluetooth.

15. The method of claim 12, wherein the vending machine comprises the backend server, and the mobile device comprises a computer-implemented customer agent that performs actions on behalf of the customer.

16. The method of claim 15, wherein a payment repository for storing payment messages between the vending machine and the backend server plays the role of the online payment bus when the customer agent and the backend server are the same.

17. The method of claim 12, wherein the online payment bus is connected to the wide-area network.

18. A method for product selection for and electronic payment to a vending machine, wherein the vending machine does not require a wide-area network connection of its own, from a mobile device operated by a customer of the vending machine, the method comprising:

capturing by the mobile device, a unique identifier for the vending machine via peer-to-peer data transfer between the vending machine and the mobile device;

retrieving by the mobile device, from a server computer, a menu of products and/or services, along with their respective prices, offered for sale by the vending machine, wherein the retrieving is based, at least in part, on the unique identifier for the vending machine;

displaying the menu on the mobile device;

receiving by the mobile device, a selection of items from the menu for purchase by the customer;

creating, by the mobile device, a payment request for the selection, wherein the payment request designates the vending machine as the payee of the payment request and includes a payment amount, wherein the payment amount is based, at least in part, on the selection;

enabling the customer, via a user interface on the mobile device, to initiate a payment process for paying the payment request, wherein the payment process comprises:

making a payment to the vending machine through an online payment gateway using a customer-specified payment credential;

receiving a confirmation statement from the online payment gateway, wherein the confirmation statement indicates that the said payment has been successfully completed;

creating a payment transaction record comprising the payment request and the said confirmation statement; and sending the payment transaction record to an online payment bus, wherein the online payment bus is configured to be a communication channel for payment messages between customers and backend servers of vending machines;

receiving by a backend server of the vending machine, the payment transaction record via the online payment bus;

creating by the backend server, a command message instructing the vending machine to dispense the selection;

sending by the backend server, the command message to the mobile device via the online payment bus;

forwarding by the mobile device, the command message to the vending machine via peer-to-peer data transfer; and dispensing the selection by the vending machine.

19. The method of claim 18 further comprising: adding a digital signature to the command message by the backend server.

20. The method of claim 18 further comprising: verifying by the backend server that the payment to the vending machine tallies with the selection's total price.

21. The method of claim 18, wherein the modality for peer-to-peer data transfer comprises Barcode, QR code, NFC, RFID, and/or Bluetooth.

22. The method of claim 18, wherein the vending machine comprises the backend server, and the mobile device comprises a computer-implemented customer agent that performs actions on behalf of the customer.

23. The method of claim 22, wherein a payment repository for storing payment messages between the vending machine and the backend server plays the role of the online payment bus when the customer agent and the backend server are the same.

* * * * *